United States Patent
Minami et al.

(10) Patent No.: US 6,212,521 B1
(45) Date of Patent: *Apr. 3, 2001

(54) DATA MANAGEMENT SYSTEM, PRIMARY SERVER, AND SECONDARY SERVER FOR DATA REGISTRATION AND RETRIEVAL IN DISTRIBUTED ENVIRONMENT

(75) Inventors: Shinji Minami, Fukuoka; Masaaki Wakamoto; Mitsuaki Kakemizu, both of Kawasaki, all of (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/049,551

(22) Filed: Mar. 27, 1998

(30) Foreign Application Priority Data

Sep. 25, 1997 (JP) .................................................. 9-259857

(51) Int. Cl.⁷ .................................................. G06F 17/30
(52) U.S. Cl. .................. 707/10; 707/1; 707/204; 707/3; 709/208; 709/216; 709/239
(58) Field of Search ................... 395/182.04, 182.03, 395/200.69; 380/21, 25; 370/254, 329; 714/6; 707/204, 3, 1, 10; 709/102, 208, 216

(56) References Cited

U.S. PATENT DOCUMENTS

| | | | |
|---|---|---|---|
| 5,513,314 | * | 4/1996 | Kandasamy et al. ........... 395/182.04 |
| 5,592,626 | * | 1/1997 | Papadimitriou et al. ............ 709/102 |
| 5,621,795 | * | 4/1997 | Baker et al. ............................ 380/21 |
| 5,633,999 | * | 5/1997 | Clowes et al. ................... 395/182.04 |
| 5,764,903 | * | 6/1998 | Yu ........................................ 709/208 |
| 5,777,989 | * | 7/1998 | McGarvey ............................ 370/254 |
| 5,819,020 | * | 10/1998 | Beeler, Jr. ....................... 395/182.03 |
| 5,828,847 | * | 10/1998 | Gehr et al. ...................... 395/200.69 |
| 5,898,780 | * | 4/1999 | Liu et al. .............................. 380/25 |
| 5,941,999 | * | 8/1999 | Matena et al. .................. 714/714.06 |
| 5,966,372 | * | 10/1999 | Wright et al. ........................ 370/329 |
| 6,065,046 | * | 5/2000 | Feinberg et al. .................... 709/216 |

FOREIGN PATENT DOCUMENTS 2-113349    4/1990   (JP) .

\* cited by examiner

Primary Examiner—Wayne Amsbury
Assistant Examiner—Thuy Pardo
(74) Attorney, Agent, or Firm—Helfgott & Karas, P.C.

(57) ABSTRACT

A data management system that allows client terminals on a network to register records with search keywords to distributed data management servers and to retrieve them by entering a specific search keyword. The entire coverage area of the network is divided into a plurality of primary areas, and each primary area is further subdivided into a plurality of secondary areas. Primary and secondary servers are deployed over the network, one for each individual primary area and secondary area, respectively. The primary servers employ a primary hash function that processes a given search keyword to derive a primary server identifier indicating one of the primary servers that governs a particular primary area where the secondary server having a record relevant to the given search keyword is located. Further, the primary servers have a secondary hash function that processes a given search keyword to derive a specific secondary server identifier indicating one of the secondary servers that is located in the same primary area as their own and has a record relevant to the given search keyword. The secondary servers are also equipped with the same secondary hash function as the primary servers'. Those two hash functions are used in both data registration and data retrieval processes.

20 Claims, 50 Drawing Sheets

ATM ADDRESS TABLE

| SERVER | ATM ADDRESS | SERVER | ATM ADDRESS |
|---|---|---|---|
| 10 | 100 | 210 | 2100 |
| 20 | 200 | 220 | 2200 |
| 30 | 300 | 230 | 2300 |
| 110 | 1100 | 310 | 3100 |
| 120 | 1200 | 320 | 3200 |
| 130 | 1300 | 330 | 3300 |

PVC CONNECTION TABLE
IN PRIMARY SERVER 30

| ATM ADDRESS | VCI/VPI |
|---|---|
| 100 | 10/10 |
| 200 | 20/20 |
| 3100 | 310/310 |
| 3200 | 320/320 |
| 3300 | 330/330 |

FIG. 6 (B)

PVC CONNECTION TABLE
IN SECONDARY SERVER 330

| ATM ADDRESS | VCI/VPI |
|---|---|
| 300 | 300/300 |
| 3100 | 3100/3100 |
| 3200 | 3200/3200 |

ACTIVATION RESPONSE MESSAGE FORMAT

| MESSAGE CLASS (=SERVER MANAGEMENT) |
|---|
| MESSAGE TYPE (=ACTIVATION RESPONSE) |
| SERVER IDENTIFIER ASSIGNED |

FIG. 8

REACTIVATION RESPONSE MESSAGE FORMAT

| MESSAGE CLASS (=SERVER ACTIVATION) |
|---|
| MESSAGE TYPE (=REACTIVATION RESPONSE) |
| SERVER IDENTIFIER ASSIGNED |
| NUMBER OF SERVER RESTORATION MESSAGES TO BE TRANSMITTED |

FIG. 10

COMMON MESSAGE FORMAT OF SECONDARY
SERVER INFORMATION MESSAGES, SECONDARY
SERVER RESTORATION MESSAGES, AND
SECONDARY SERVER SUBSTITUTION MESSAGES

| MESSAGE CLASS (=SERVER MANAGEMENT) |
| --- |
| MESSAGE TYPE |
| SERVER NETWORK ADDRESS |
| PRIMARY SERVER IDENTIFIER |
| SECONDARY SERVER IDENTIFIER |

FIG. 12

COMMON MESSAGE FORMAT OF DATA RETRIEVAL
MESSAGE CLASS, DATA REGISTRATION MESSAGE
CLASS, AND SEARCH REPORT MESSAGE CLASS

| MESSAGE CLASS |
| --- |
| MESSAGE TYPE |
| SEARCH KEYWORD (=IP ADDRESS) |
| DATA OBJECT TO BE RETRIEVED (=ATM ADDRESS) |
| PRIMARY SERVER IDENTIFIER |
| SECONDARY SERVER IDENTIFIER |

FIG. 13

FORMAT OF DATA REGISTRATION REQUEST
MESSAGES FROM TERMINAL TO SERVER

| |
|---|
| MESSAGE TYPE (=DATA REGISTRATION REQUEST) |
| SEARCH KEYWORD (=IP ADDRESS) |
| DATA OBJECT TO BE RETRIEVED (=ATM ADDRESS) |

FIG. 14

FORMAT OF DATA RETRIEVAL REQUEST
MESSAGES FROM TERMINAL TO SERVER

| MESSAGE TYPE (=DATA RETRIEVAL REQUEST) |
|---|
| SEARCH KEYWORD (=IP ADDRESS) |

FIG. 15

FORMAT OF SEARCH REPORT
MESSAGES FROM SERVER TO TERMINAL

| MESSAGE TYPE (=SEARCH REPORT) |
| --- |
| SEARCH KEYWORD (=IP ADDRESS) |
| DATA OBJECT TO BE RETRIEVED (=ATM ADDRESS) |

FIG. 16

SERVER INFORMATION STORAGE IN SYSTEM SUPERVISORY SERVER

| PRIMARY SERVER ACTIVATION COUNTER (PRIMARY COUNTER) |
|---|
| SECONDARY COUNTER (PRIMARY AREA WITH ID1=1) |
| SECONDARY COUNTER (PRIMARY AREA WITH ID1=2) |
| SECONDARY COUNTER (PRIMARY AREA WITH ID1=3) |
| NETWORK ADDRESS OF PRIMARY SERVER WITH ID1=1 |
| NETWORK ADDRESS OF SECONDARY SERVER WITH ID2=1 |
| NETWORK ADDRESS OF SECONDARY SERVER WITH ID2=2 |
| NETWORK ADDRESS OF SECONDARY SERVER WITH ID2=3 |
| NETWORK ADDRESS OF PRIMARY SERVER WITH ID1=2 |
| NETWORK ADDRESS OF SECONDARY SERVER WITH ID2=1 |
| NETWORK ADDRESS OF SECONDARY SERVER WITH ID2=2 |
| NETWORK ADDRESS OF SECONDARY SERVER WITH ID2=3 |
| NETWORK ADDRESS OF PRIMARY SERVER WITH ID1=3 |
| NETWORK ADDRESS OF SECONDARY SERVER WITH ID2=1 |
| NETWORK ADDRESS OF SECONDARY SERVER WITH ID2=2 |
| NETWORK ADDRESS OF SECONDARY SERVER WITH ID2=3 |

FIG. 17

SERVER INFORMATION STORAGE IN PRIMARY SERVER

| MY OWN PRIMARY SERVER IDENTIFIER (MY ID1) |
|---|
| NETWORK ADDRESS OF PRIMARY SERVER WITH ID1=1 |
| CONNECTION IDENTIFIER OF PVC TO PRIMARY SERVER WITH ID1=1 |
| NETWORK ADDRESS OF PRIMARY SERVER WITH ID1=2 |
| CONNECTION IDENTIFIER OF PVC TO PRIMARY SERVER WITH ID1=2 |
| NETWORK ADDRESS OF PRIMARY SERVER WITH ID1=3 |
| CONNECTION IDENTIFIER OF PVC TO PRIMARY SERVER WITH ID1=3 |
| SECONDARY SERVER ACTIVATION COUNTER (SECONDARY COUNTER) |
| NETWORK ADDRESS OF SECONDARY SERVER WITH ID2=1 |
| CONNECTION IDENTIFIER OF PVC TO SECONDARY SERVER WITH ID2=1 |
| NETWORK ADDRESS OF SECONDARY SERVER WITH ID2=2 |
| CONNECTION IDENTIFIER OF PVC TO SECONDARY SERVER WITH ID2=2 |
| NETWORK ADDRESS OF SECONDARY SERVER WITH ID2=3 |
| CONNECTION IDENTIFIER OF PVC TO SECONDARY SERVER WITH ID2=3 |

FIG. 18

SERVER INFORMATION STORAGE IN SECONDARY SERVER

| MY OWN SECONDARY SERVER IDENTIFIER (MY ID2) |
|---|
| CONNECTION IDENTIFIER OF PVC TO LOCAL PRIMARY SERVER |
| SECONDARY SERVER ACTIVATION COUNTER (SECONDARY COUNTER) |
| NETWORK ADDRESS OF SECONDARY SERVER WITH ID2=1 |
| CONNECTION IDENTIFIER OF PVC TO SECONDARY SERVER WITH ID2=1 |
| NETWORK ADDRESS OF SECONDARY SERVER WITH ID2=2 |
| CONNECTION IDENTIFIER OF PVC TO SECONDARY SERVER WITH ID2=2 |
| NETWORK ADDRESS OF SECONDARY SERVER WITH ID2=3 |
| CONNECTION IDENTIFIER OF PVC TO SECONDARY SERVER WITH ID2=3 |

FIG. 19

REACTIVATION REQUEST UNIT IN PRIMARY SERVER

ACTIVATION REQUEST UNIT IN PRIMARY SERVER

COMMAND PARSER IN PRIMARY SERVER

SERVER INFORMATION STORAGE WHEN ALL PRIMARY SERVERS ARE ACTIVATED

FIG. 46(A)

SYSTEM SUPER-
VISORY SERVER 0

| 3 |
|---|
| 0 |
| 0 |
| 0 |

| 100 |
|---|
| 0 |
| 0 |
| 0 |
| 200 |
| 0 |
| 0 |
| 0 |
| 300 |
| 0 |
| 0 |
| 0 |

FIG. 46(B)

PRIMARY
SERVER 30

| 3 |
|---|
| 100 |
| 10/10 |
| 200 |
| 20/20 |
| 0 |
| 0 |

| 0 |
|---|

| 0 |
|---|
| 0 |
| 0 |
| 0 |
| 0 |
| 0 |

SERVER INFORMATION STORAGE WHEN ALL
SECONDARY SERVERS ARE ACTIVATED

FIG. 47(A)
SYSTEM SUPER-
VISORY SERVER 0

| 3 |
|---|
| 3 |
| 3 |
| 3 |
| 100 |
| 1100 |
| 1200 |
| 1300 |
| 200 |
| 2100 |
| 2200 |
| 2300 |
| 300 |
| 3100 |
| 3200 |
| 3300 |

FIG. 47(B)
PRIMARY
SERVER 30

| 3 |
|---|
| 100 |
| 10/10 |
| 200 |
| 20/20 |
| 0 |
| 0 |

| 3 |
|---|
| 3100 |
| 310/310 |
| 3200 |
| 320/320 |
| 3300 |
| 330/330 |

FIG. 47(C)
SECONDARY
SERVER 330

| 3 |
|---|
| 3000/3000 |
| 3 |
| 3100 |
| 3100/3100 |
| 3200 |
| 3200/3200 |
| 0 |
| 0 |

FIG. 48(A) PRIMARY SERVER 10

| LOCAL BACKUP DATA STORAGE | REMOTE BACKUP DATA STORAGE |
|---|---|
| 1 | 1 |
| 4 | 1 2 |
| 5 4 | 6 2 |
| 3 | 1 |

FIG. 48(B) PRIMARY SERVER 20

| LOCAL BACKUP DATA STORAGE | REMOTE BACKUP DATA STORAGE |
|---|---|
| 0 | 1 |
| 0 | 4 |
| 0 | 5 4 |
| 0 | 2 |

FIG. 48(C) PRIMARY SERVER 30

| LOCAL BACKUP DATA STORAGE | REMOTE BACKUP DATA STORAGE |
|---|---|
| 0 | 1 |
| 0 | 5 |
| 0 | 5 5 |
| 0 | 1 |

FIG. 48(D) SECONDARY SERVER 110

| REGULAR DATA STORAGE | LOCAL REPLICATED DATA STORAGE | REMOTE REPLICATED DATA STORAGE |
|---|---|---|
| 1 | 1 | 1 |
| 5 | 1 2 | 1 2 |
| 5 5 | 6 2 | 6 2 |
| 3 | 2 | 1 |

FIG. 48(E) SECONDARY SERVER 120

| REGULAR DATA STORAGE | LOCAL REPLICATED DATA STORAGE | REMOTE REPLICATED DATA STORAGE |
|---|---|---|
| 1 | 0 | 0 |
| 1 2 | 0 | 0 |
| 6 2 | 0 | 0 |
| 1 | 0 | 0 |

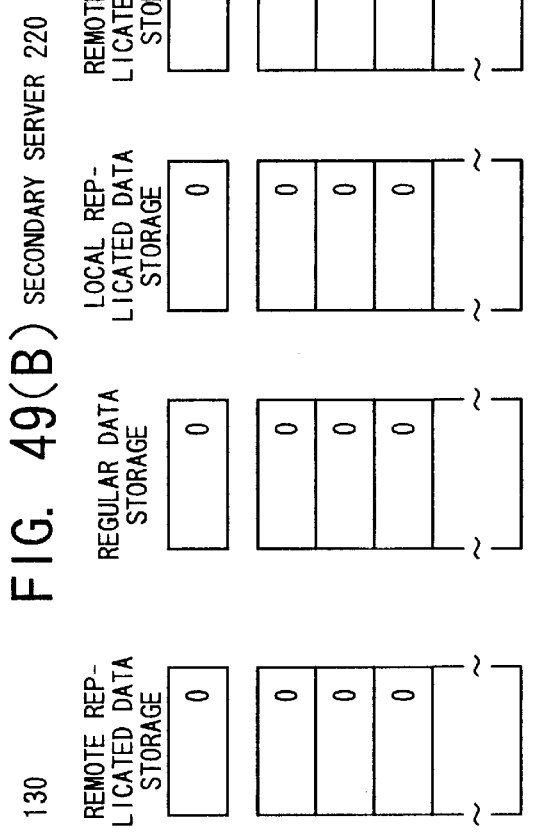
FIG. 49(A) SECONDARY SERVER 130
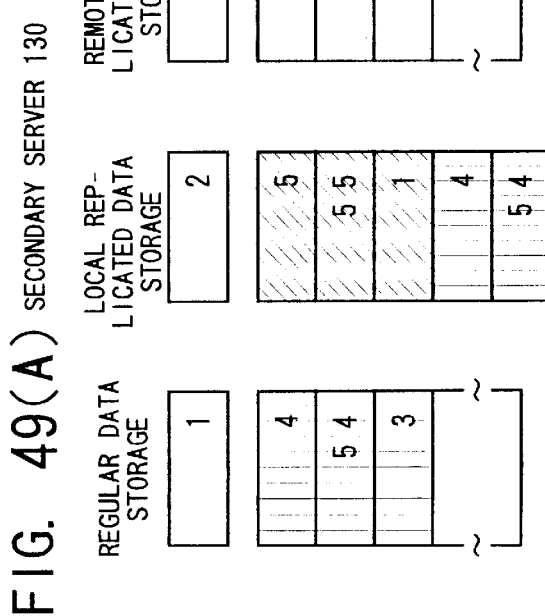
FIG. 49(B) SECONDARY SERVER 220
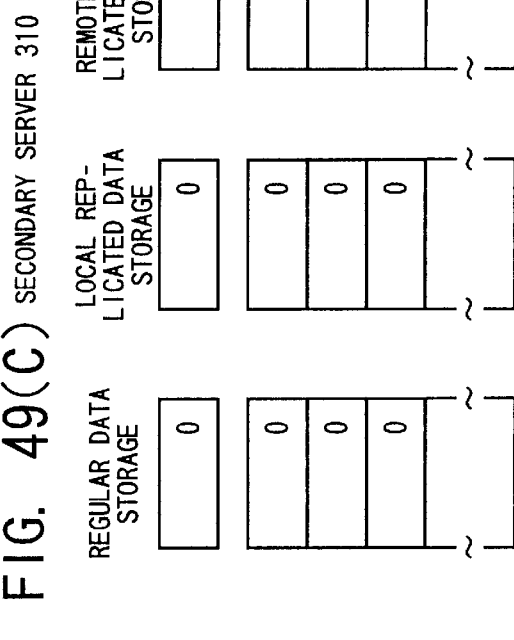
FIG. 49(C) SECONDARY SERVER 310

DATA MANAGEMENT SYSTEM, PRIMARY SERVER, AND SECONDARY SERVER FOR DATA REGISTRATION AND RETRIEVAL IN DISTRIBUTED ENVIRONMENT

BACKGROUND OF THE INVENTION

1. Field of the Invention

The present invention relates to data management systems, primary servers, and secondary servers for data registration and retrieval in distributed environment, and particularly to a data management system which allows client terminals to register and retrieve information that is distributed widely on a network, as well as to primary and secondary servers used in this system.

2. Description of the Related Art

ATM-LAN systems incorporate a public Asynchronous Transfer Mode (ATM) network as part of existing Local Area Network (LAN) environments. For a user terminal trying to communicate with a remote terminal or server having a specific IP (Internet Protocol) address, it is necessary to set up an ATM connection with the remote terminal before starting the session, for ATM is a connection-oriented technology. To establish this connection, the user terminal has to know the exact ATM address associated with the destination IP address. If such address information is not available at hand, the terminal will send the IP address in question to an ATM address resolution server (ATM-ARP server) on the network by using the Address Resolution Protocol (ARP) to inquire about what the corresponding ATM address is. The present invention proposes several techniques applicable to such ATM-ARP servers, essential facilities for interconnecting the existing LANs and public ATM networks. They can also be used in data management systems that provides data registration and retrieval services in a distributed environment.

In general, data management systems provide a common infrastructure for terminal users to register and retrieve information on the network. With respect to the roles of servers, conventional data management systems are broadly classified into three models as shown in FIGS. 50(A), 50(B), and 50(C). In those figures, each round frame represents the entire space of a computer network; black boxes A, B, and C show data management servers; white boxes x, y, and z indicate terminals. Thin solid arrows represent the flow of data registration requests, while bold solid arrows show the distribution of new data entries. Thin broken arrows indicate data retrieval requests and their responses between terminals and servers, while bold broken arrows those between servers.

FIGS. 50(A) to 50(C) commonly assume that the data management servers A, B, and C manage the terminals' host names such as "x," "y," and "z," and their network addresses. They also illustrate that the terminal x is requesting the registration of its own address ("x=10"), and the terminal z is sending a query message ("y?") about what address should be used to reach the terminal y. Regarding the system of FIG. 50(C), note that the terminal y's address information resides only in the data management server B.

FIG. 50(A) shows a first system model. This simplest model employs only one data management server A, where data objects are collected from the entire network to manage them in a concentrated manner. Every request for data registration and retrieval from the terminals x, y, and z is transmitted to the sole data management server A. In the present situation, the data management server A processes the registration request message for address information "=10" from the terminal x by entering the received information into its own data storage as a new record. Further, in response to the data retrieval request message "y?" from the terminal z, the data management server A searches its data storage for the requested address information, thereby returning a record "y=11" to the requesting terminal z.

FIG. 50(B) shows a second system model, where a plurality of data management servers A, B, and C are deployed in the same network to share the processing loads, as opposed to the first system model where all information storage and the management tasks are concentrated in a single server. The individual data management servers in this model have a synchronization mechanism for the data registration process. More specifically, when a registration request message is received from any of the terminals x, y, and z, they forward the same information to other servers after saving it in their own data storage. In the present example, the data management server A receives a registration request message for address information "x=10" from the terminal x, stores it into its local data storage, and then notifies the other data management servers B and C of the information. Upon receipt of this notification, the data management servers B and C store the information into their respective data storage just in the same way as they do when they have received registration request messages directly from terminals. In other words, the synchronization mechanism is a facility that allows each individual server to locally keep the entire set of information collected from the network similarly to the data management server A in the first system model. Therefore, in the second system model, every server can immediately respond to any information request from terminals.

FIG. 50(C) shows a third system model, which includes a plurality of data management servers as in the second system model, but no synchronization mechanism is implemented in the registration process of new records. In the present example, when a registration request message containing address information "x=10" is received from a terminal x, the data management server A stores it to its own data storage, but never sends it to the other data management servers B and C. This means that each individual data management server controls a different set of records. Take the data management server C for example. In FIG. 50(C), this server searches its local data storage in response to a data retrieval request message "y?" from a terminal z. If no match is found, the data management server C forwards the data retrieval request message "y?" to another server, according to a rule that has been defined previously in the system. In the server network illustrated in FIG. 50(C), the data management server A is designed to forward unsolved request messages to the data management server B. Likewise, the server B forwards such messages to the server C, and the server C to the server A. Accordingly, the above query message "y?" is first passed from the data management server C to the next server A, and if the server A is unable to answer the query, the message is further transferred to the server B.

In the present example, the record "y=11" in question is available in the last data management server B. Reversely tracing the same route, the retrieved record reaches the data management server C, which has originally thrown the message into the network of servers. Finally, the data management server C returns this record "y=11" to the requesting terminal z.

The above-described three system models, however, have some problems described below. While providing a simple and safe way of data retrieval, the first system model requires a single data management server to maintain vast amounts of data, thus imposing a heavy processing load on that server alone. This concentration of workloads may result in slow response to the queries from users.

The second system model avoids the above problem of concentrated workloads by deploying many data management servers to share the data retrieval tasks. However, the mechanism implemented in the second model for server-to-server synchronization will increase the network traffic when records are newly entered or updated.

As in the second model, the third system model distributes the data processing workloads to a plurality of data management servers to avoid the load concentration problem with the first model. It further solves the problem of increased network traffic, which discourages the use of the second system model, by eliminating data transfer for synchronization between servers. Nevertheless, this elimination of server synchronization mechanisms totally prevents the data management servers from knowing what records are stored in each other's local storage, and thus the unsolved query messages could be sent around from one server to another. Accordingly, the system suffers from increased network loads when processing data retrieval requests from terminals, and the very disadvantage of the third model is this inefficiency in data search. Consider, for example, that a user has issued a data retrieval request for some non-registered data. This causes in fact the worst situation, where all data management servers in the system are forced to conduct data searches which would end up with totally fruitless results.

As such, any of the three conventional system models has some performance bottlenecks. It should be also noted that the problems clarified above would be more serious as the network grows.

SUMMARY OF THE INVENTION

Taking the above into consideration, a first object of the present invention is to provide a data management system which relieves processing loads imposed on individual data management servers by distributing data registration and retrieval tasks and reducing the amount of data maintained in each server. Moreover, a second object of the present invention is to provide a primary server for use in the above data management system; a third object of the present invention is to provide a secondary server for use in the above data management system.

To accomplish the first object, according to the present invention, there is provided a data management system which allows terminals on a network to register records with search keywords and to retrieve the records by entering a specific search keyword. This system comprises the following elements:

a plurality of primary areas which constitute an entire coverage area of the network;

a plurality of secondary areas which constitute each of the primary areas;

a plurality of primary servers, one for each primary area, which are uniquely identified in the network by primary server identifiers assigned thereto;

a plurality of secondary servers, one for each secondary area, which are uniquely identified in each primary area by secondary server identifiers assigned thereto;

a primary transformation unit, disposed in each primary server, for processing a given search keyword to derive a specific primary server identifier indicating one of the primary servers that governs a particular primary area where the secondary server having a record corresponding to the given search keyword is located; and a secondary transformation unit, disposed in each primary server and each secondary server, for processing a given search keyword to derive a specific secondary server identifier indicating one of the secondary servers that is located in the same primary area and has a record corresponding to the given search keyword.

To accomplish the second object, according to the present invention, there is provided a primary server used in a data management system that allows terminals on a network to register records with search keywords and to retrieve the records by entering a specific search keyword, the data management system covers a plurality of primary areas, the primary server being deployed in each primary area to govern a plurality of secondary servers located therein, This primary server comprises the following elements:

a primary server identifier which allows the primary server to be uniquely identified in the network;

primary transformation unit for processing a given search keyword to derive a specific primary server identifier indicating one of the primary servers that governs the primary area where the secondary server having a record corresponding to the given search keyword is located; and secondary transformation unit for processing a given search keyword to derive a secondary server identifier indicating one of the secondary servers that is located in the same primary area and has a record corresponding to the given search keyword.

To accomplish the third object, according to the present invention, there is provided a secondary server used in a data management system that allows terminals on a network to register records with search keywords and to retrieve the records by entering a specific search keyword, the data management system covers a plurality of primary areas, a primary server being deployed in each primary area to cover a plurality of secondary areas constituting the primary area, the secondary server being deployed in each secondary area. This secondary server comprises the following elements:

a secondary server identifier which allows the secondary server to be uniquely identified within the primary area where the secondary server belongs; and a secondary transformation unit for processing a given search keyword to derive a specific secondary server identifier indicating one of the secondary servers that is located in the same primary area and has a record corresponding to the given search keyword.

The above and other objects, features and advantages of the present invention will become apparent from the following description when taken in conjunction with the accompanying drawings which illustrate a preferred embodiment of the present invention by way of example.

BRIEF DESCRIPTION OF THE DRAWINGS

FIG. 5 is a table which shows ATM addresses of servers;

FIG. 6(A) is a diagram which illustrates connection parameters stored in a primary server after PVCs have been established;

FIG. 6(B) is a diagram which illustrates connection parameters stored in a secondary server after PVCs have been established;

FIG. 8 is a diagram which shows the format of activation response messages used between servers;

FIG. 10 is a diagram which shows the format of reactivation response messages used between servers;

FIG. 12 is a diagram which shows the format of secondary server information messages, secondary server restoration messages, and secondary server substitution messages used between servers;

FIG. 13 is a diagram which shows the common message format used between servers for data retrieval, data registration, and search report;

FIG. 14 is a diagram which shows the format of data registration request messages used between terminals and secondary servers;

FIG. 15 is a diagram which shows the format of data retrieval request messages used between terminals and secondary servers;

FIG. 16 is a diagram which shows the format of search report messages used between terminals and secondary servers;

FIG. 17 is a diagram which shows the data structure of server information storage in a system supervisory server;

FIG. 18 is a diagram which shows the data structure of server information storage in a primary server;

FIG. 19 is a diagram which shows the data structure of server information storage in a secondary server;

FIGS. 46(A) and 46(B) are diagrams which show the contents of server information storage in a system supervisory server and a primary server after all primary servers have been activated;

FIGS. 47(A) to 47(C) are diagrams which show the contents of server information storage in a system supervisory server, a primary server, and a secondary server after all secondary servers have been activated;

FIG. 48(A) is a diagram which shows the contents of local backup data storage and remote backup data storage in a primary server 10;

FIG. 48(B) is a diagram which shows the contents of local backup data storage and remote backup data storage in a primary server 20;

FIG. 48 (C) is a diagram which shows the contents of local backup data storage and remote backup data storage in a primary server 30;

FIG. 48 (D) is a diagram which shows the contents of the regular data storage, local replicated data storage, and remote replicated data storage in a secondary server 110;

FIG. 48(E) is a diagram which shows the contents of regular data storage, local replicated data storage, and remote replicated data storage in a secondary server 120;

FIG. 49(A) is a diagram which shows the contents of regular data storage, local replicated data storage, and remote replicated data storage in a secondary server 130;

FIG. 49(B) is a diagram which shows the contents of regular data storage, local replicated data storage, and remote replicated data storage in a secondary server 220;

FIG. 49(C) is a diagram which shows the contents of regular data storage, local replicated data storage, and remote replicated data storage in a secondary server 310;

DESCRIPTION OF THE PREFERRED EMBODIMENTS

An embodiment of the present invention will be described below with reference to the accompanying drawings.

Figure 1:
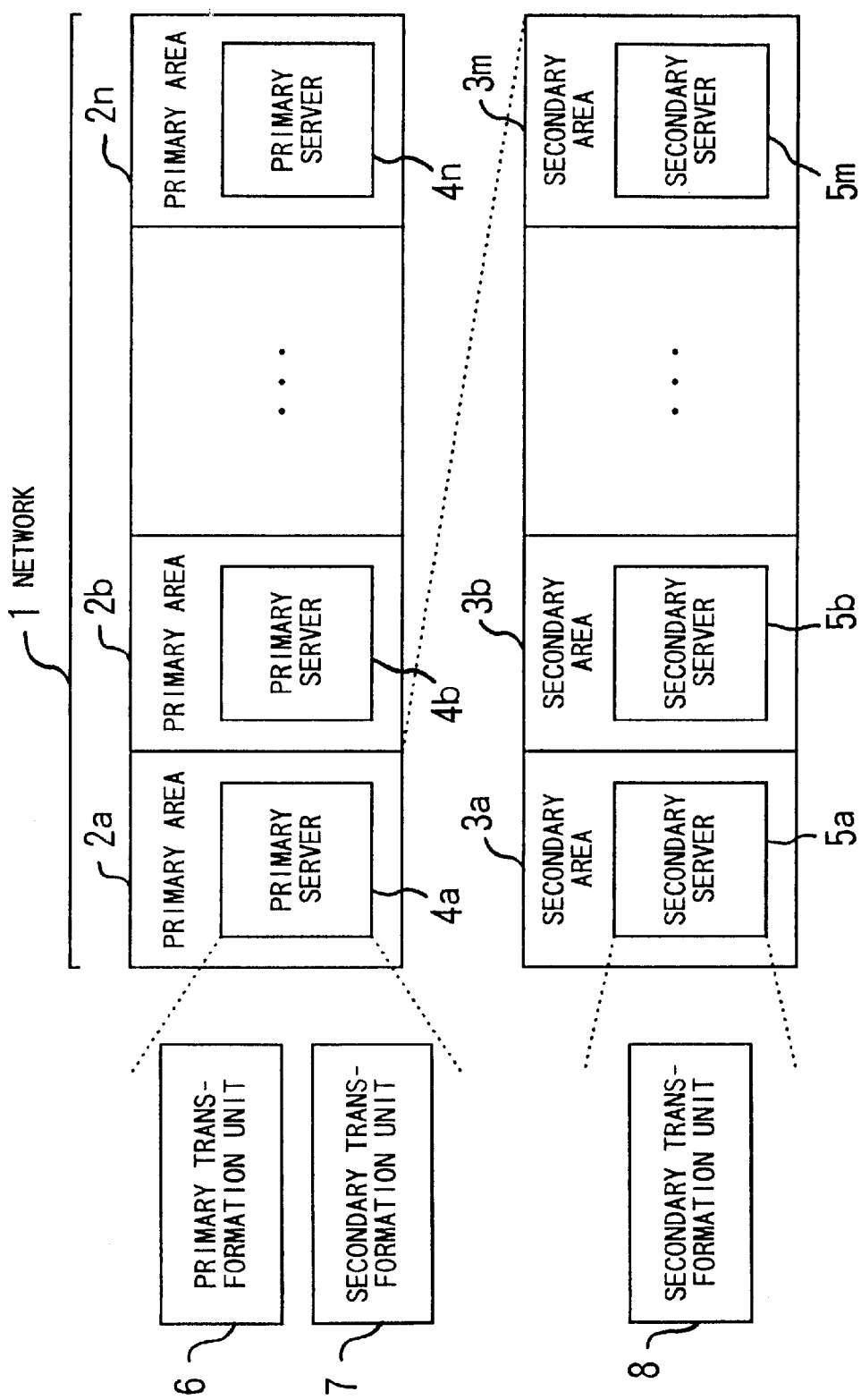
FIG. 1 is a conceptual view of the present invention.

Referring first to FIG. 1, the following will describe the concept of a data management system in which the present invention is implemented. This system allows terminals (not shown) on a network 1 to register records with search keywords and to retrieve the records by entering a specific search keyword. The system comprises the following elements:

a plurality of primary areas 2a to 2n which constitute the entire coverage area of the network 1;

a plurality of secondary areas 3a to 3m which constitute each of the primary areas 2a to 2n;

a plurality of primary servers 4a to 4n, one for each of the primary areas 2a to 2n, which are uniquely identified in the network 1 by primary server identifiers assigned thereto;

a plurality of secondary servers 5a to 5m, one for each of the secondary areas 3a to 3n, which are uniquely identified in each primary area by secondary server identifiers assigned thereto;

a primary transformation unit 6, disposed in each of the primary servers 4a to 4n, for processing a given search keyword to derive a specific primary server identifier indicating one of the primary servers 4a to 4n that governs a particular primary area where the secondary server having a record corresponding to the given search keyword is located;

secondary transformation units 7 and 8, disposed in each of the primary servers 4a to 4n, for processing a given search keyword to derive a specific secondary server identifier indicating one of the secondary servers 5a to 5m that is located in the same primary area and has a record corresponding to the given search keyword; and a secondary transformation unit 8, disposed in each of the secondary servers 5a to 5m, for processing a given search keyword to derive a specific secondary server identifier indicating one of the secondary servers 5a to 5m that is located in the same primary area and has a record corresponding to the given search keyword.

While FIG. 1 only illustrates a plurality of secondary areas 3a to 3m constituting the primary area 2a, the other primary areas 2b to 2n also have their own subordinate secondary areas, in each of which a secondary server is disposed. Likewise, the primary servers 4b to 4n actually have their own primary and secondary transformation unit, although FIG. 1 only shows a single set of primary and secondary transformation units 6 and 7 disposed in the server 4a. Further, other secondary servers 5b to 5m have their own secondary transformation units, although FIG. 1 only shows the secondary transformation unit 8 disposed in the secondary server 5a.

As such, the secondary transformation units are disposed in every primary server and secondary server. Note that their content is specific to each primary area; i.e., the primary server governing a specific primary area and its subordinate secondary servers share the same content (or algorithms, actually) in their respective secondary transformation units, as will be illustrated in later part of the description.

Now, in the above-described structural arrangement, it is supposed that a terminal located in the secondary area 3a, for instance, is attempting to newly enter some registration data that consists of a search keyword and a data object to be shared in the network. This new registration data will be saved not only in the secondary server 5a, but also in another secondary server deployed in the primary area 2a, and further in a secondary server deployed in a different primary area. More specifically, the secondary server 5a, having received a data registration request from a terminal, first stores the received registration data into its local storage. At the same time, the secondary server 5a identifies another secondary server in the primary area 2a by using its own secondary transformation unit 8, and requests the identified secondary server to store the same registration data in its data storage. The appointed secondary server stores the registration data as requested. The secondary server 5a further sends a request for the data registration to the primary server 4a governing the primary area 2a where the secondary server 5a is located. Upon receipt of this request, the primary server 4a determines another primary server by using its own primary transformation unit 6 and requests the determined primary server to store the same registration data. Having received this request, the primary server identifies a secondary server in its own coverage area by using its secondary transformation unit and requests it to store the registration data. The secondary server stores the registration data as requested by the primary server.

In this way, the data registration process is conducted in the following three stages: (1) registration in a secondary server that has accepted a data registration request from a terminal, (2) registration in another secondary server located in the same primary area, and (3) registration in still another secondary server located in a different primary area. The system conducts data registration in such a 3-stage process where registration data traces the logical hierarchy of data management servers, thus enabling the same data objects to be registered in a distributed manner over the network.

In the present invention, data retrieval is carried out by tracing just the same hierarchical path. Suppose, for instance, that a terminal located in the secondary area 3a has sent a data retrieval request to the secondary server 5a, along with a specific search keyword. Upon receiving this request, the secondary server 5a tries to search its own data storage by using the given search keyword information. If no match is found, then the secondary server 5a identifies another secondary server in the same primary area 2a by activating its own secondary transformation unit 8 and requests the identified server to make a search. That secondary server attempts to retrieve a record relevant to the given search keyword, as requested by the secondary server 5a. If it is still unable to find such a record, the secondary server, now acting as an agent for the secondary server 5a, sends the data retrieval request to the primary server 4a in the same primary area 2a. The primary server 4a forwards the request to another primary server that is identified by using its own primary transformation unit. That primary server further forwards the request to a secondary server that is found within its own coverage area by using a secondary transformation unit of its own. The secondary server searches its local data storage as requested by the primary server.

The above-described data retrieval process can be summarized in the following three stages: (1) search in a secondary server that has accepted a data retrieval request from a terminal, (2) search in another secondary server located in the same primary area, and (3) search in still another secondary server located in a different primary area. This hierarchical network search will reach the desired record by executing at most three stages.

Now, the present embodiment of the invention will be described in further detail below, by presenting a specific implementation in an ATM-ARP server. This ATM-ARP server provides ATM address resolution services in an ATM-LAN system which interconnects the existing LANs and public ATM network. Here, each IP address should be interpreted into physical ATM address when delivering messages over the ATM network.

FIG. 2(A) shows a network divided into a plurality of areas at a first step. FIG. 2(B) shows the same network further subdivided into a plurality of smaller areas at a second step. More specifically, the network's coverage area is segmented into three "primary areas" at the first step, and three servers 10, 20, and 30 are deployed in the three divided areas, respectively. Those servers 10, 20, and 30 are referred to as "primary servers." At the second step, each individual primary area is further segmented into three "secondary areas." Data management servers 110, 120, 130, 210, 220, 230, 310, 320, and 330 are each deployed in those smaller areas as FIG. 2(B) shows, which servers are referred to as "secondary servers." To govern the primary servers 10, 20, and 30, there is provided a system supervisory server 0. Although FIG. 2(B) only depicts a limited number of terminals 40, 41, 50, 60, and 70, many terminals are distributed in each secondary area.

Figure 3:
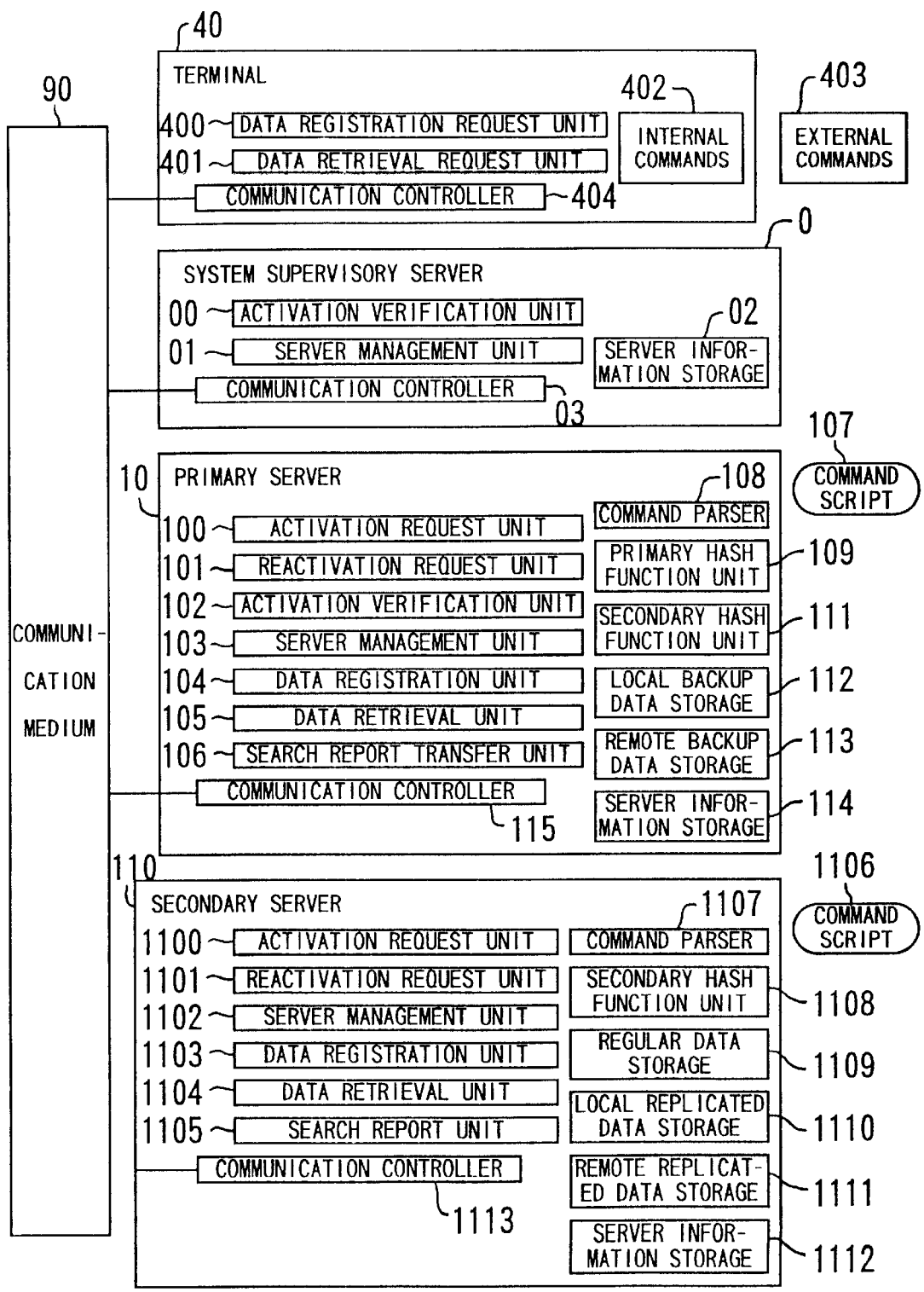
FIG. 3 is a block diagram which shows the internal structure of a system supervisory server, primary servers, secondary servers, and terminals.

FIG. 3 is a block diagram showing the internal structure of the system supervisory server 0, primary server 10, secondary server 110, and terminal 40, where the secondary server 110 and terminal 40 reside in the same secondary area, as part of the primary area governed by the primary server 10. When the terminal 40 has encountered an event that needs data registration, its data registration request unit 400 issues a data registration request message. The data to be registered here actually consists of a data object, the body of a record, and search keyword information that allows the record to be retrieved from target data storage. In the present context of the ATM-ARP server application, the registration data is a set of IP and ATM addresses, where the IP address serves as a search keyword. When a request for data retrieval has arisen in some process in the terminal 40, a data retrieval request unit 401 issues a data retrieval request message. FIG. 3 depicts internal commands 402 and external commands 403 which respectively represent an internal process and an external process that may raise such requests.

The system supervisory server 0 has an activation verification unit 00 to respond to some messages that fall under "server activation message class", which include activation request and reactivation request messages. It also has a server management unit 01 that accepts messages under "server management message class" and extracts necessary server information from them. This class of messages actually include secondary server information messages and secondary server substitution messages. The extracted server information is saved into a server information storage 02.

The primary server 10 comprises several functional units and local data storage as described below. An activation request unit 100 issues activation request messages, while a reactivation request unit 101 issues reactivation request messages. An activation verification unit 102 processes messages under "server activation message class" (i.e., activation request or reactivation request messages) when they are received. A server management unit 103 receives messages under "server management message class" (i.e., activation response messages, reactivation response messages, primary server information messages, primary server restoration messages, secondary server restoration messages, and primary server substitution messages), and extracts necessary server information from them. A data registration unit 104 receives messages under "data registration message class" (i.e., extra data registration request messages, data registration request messages, replicated data registration request messages, extra data restoration messages, and remote backup data restoration messages) and performs data registration tasks according to them. A data retrieval unit 105 receives messages that fall under "data retrieval message class" (i.e., data retrieval request messages, replicated data retrieval request messages, and data restoration request messages) and performs data retrieval tasks according to them. A search report transfer unit 106 receives messages under "search report message class" (i.e., "data found" and "data not found" messages) and performs data transfer tasks according to them. A command script 107 is a program script that instructs activation or reactivation of servers. A command parser 108 parses this script 107 and activates the activation request unit 100 or reactivation request unit 101. A primary hash function unit 109 and secondary hash function unit 111 are used to obtain a primary and secondary server identifiers, respectively, from a given search keyword. Local backup data storage 112 stores such records that have been delivered in extra data registration request messages. Here, the term "local backup data" denotes that the data stored in this storage 112 is replicas of the original registration data that is stored in secondary servers located in the same primary area. Remote backup data storage 113 saves, as a measure of precaution, such records that have been delivered in replicated data registration request messages. Here, the term "remote backup data" denotes that the data stored in this storage 113 is replicas of the original registration data that is stored in secondary servers located in remote primary areas. A server information storage 114 stores server information (i.e., parameters for network connection) extracted by the server management unit 103.

Similarly to the primary server 10, the secondary server 110 comprises the following functional units and information storage. An activation request unit 1100 issues activation request messages, while a reactivation request unit 1101 issues reactivation request messages. The server management unit 1102 receives messages that fall under "server management message class" (i.e., activation response messages, reactivation response messages, secondary server information messages, secondary server restoration messages, primary server substitution messages, and secondary server substitution messages), and extracts necessary server information from the received messages. A data registration unit 1103 receives messages under "data registration message class" (i.e., data registration request messages, local replicated data registration request messages, remote replicated data registration request messages, extra data restoration messages, regular data restoration messages, local replicated data restoration messages, and remote replicated data restoration messages), and enters given registration data to appropriate data storage in accordance with the message types. A data retrieval unit 1104, in turn, receives messages under "data retrieval message class" (i.e., data retrieval request messages, local replicated data retrieval request messages, remote replicated data retrieval request messages, data restoration request messages, and extra data restoration request messages). It retrieves requested records from data storage relevant to the message types. When a message under "search report message class" (i.e., "data found" or "data not found" messages) is received, a search report unit 1105 reports the search results to the requesting terminal, based on a network connection obtained from the search keyword information. It also sends a search report when the secondary server 110 has received a data retrieval request message directly from a terminal and has successfully completed the requested data retrieval by itself. A command script 1106 is a program script that instructs activation or reactivation of servers. A command parser 1107 parses the script and triggers the activation request unit 1100 or reactivation request unit 1101. A secondary hash function unit 1108 is used to calculate a secondary server identifier from a given search keyword.

Regular data storage 1109 is the first place to store the data contained in the data registration request messages when they are directly received from terminals. Local replicated data storage 1110 registers information, when local replicated data registration request message are received. Here, the term "local replicated data" denotes that the data stored in this storage 1110 is replicas of the original registration data that is stored in other secondary servers located in the same (or local) primary area. In contrast to this, remote replicated data storage 1111 is used to save information extracted from remote replicated data registration request messages when they are received. The term "remote replicated data" denotes that the data stored in this storage 1111 is replicas of the original registration data that is stored in other secondary servers located in some remote primary areas. The server information storage 1112 stores server information extracted by the server management unit 1102.

The terminal 40 and servers 0, 10, and 110 transmit and receive messages through their respective communication controllers 404, 03, 115, and 1113. They are triggered by internal functional blocks when transmitting messages, while being activated by a communication medium 90 when receiving messages. FIG. 3 schematically shows this communication medium 90 as a network environment including various interface devices, circuit switching equipment, and transmission media for local area and wide area networks.

FIG. 5 shows a table of ATM addresses assigned to the servers. The primary servers 10, 20, and 30 and the secondary servers 110, 120, 130, 210, 220, 230, 310, 320, and 330 function as ATM-ARP servers which maintain the records of IP-ATM address pairs to allow an ATM address to be retrieved by entering a specific IP address as a search keyword.

Figure 4:
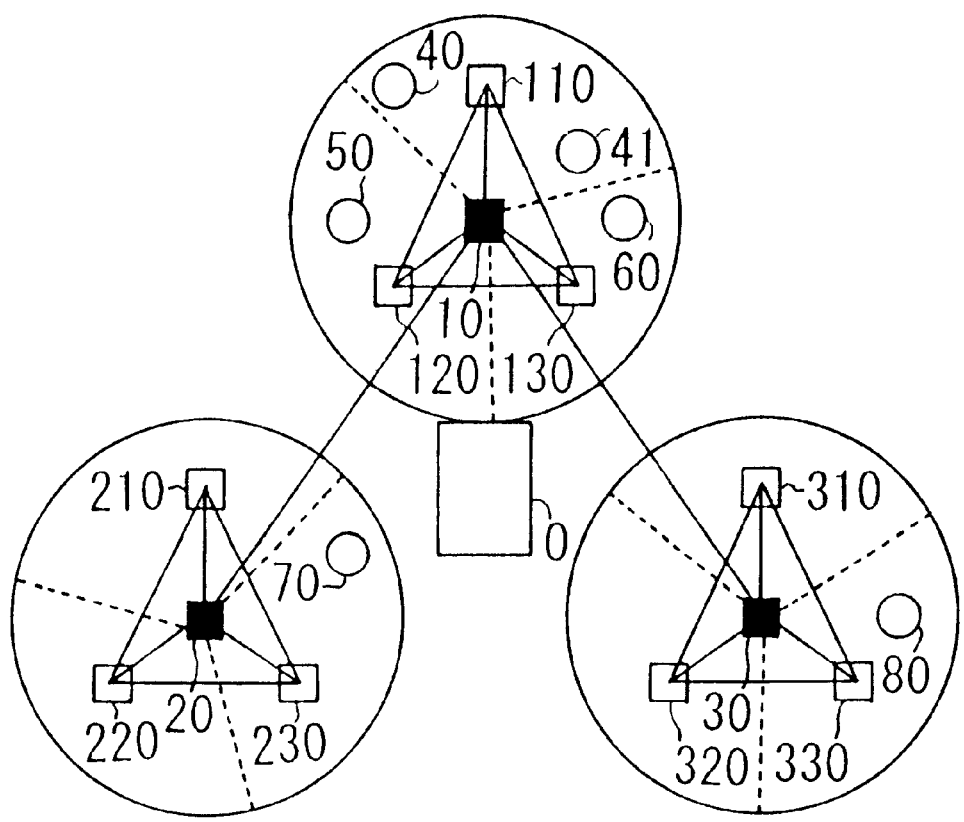
FIG. 4 is a diagram which shows a configuration of a network where permanent virtual connections (PVCs) have been established between servers.

The present embodiment deploys a plurality of ATM-ARP servers on an ATM network and they frequently communicate with each other through ATM connections between servers. It is thus preferable to pre-establish some Permanent Virtual Connections (PVCs) to interconnect the servers in the network. FIG. 4 illustrates a typical configuration of such a network where PVCs have been established.

FIGS. 6(A) and 6(B) show what information is stored in the primary server 30 and secondary server 330, concerning the above-described PVCs established in the network.

Figure 7:
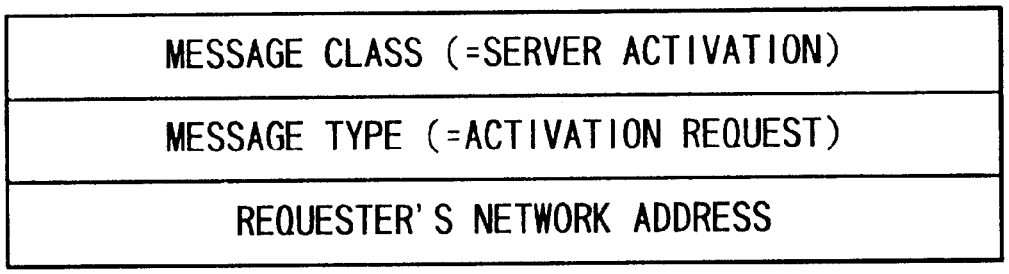
FIG. 7 is a diagram which shows the format of activation request messages used between servers.

FIGS. 7 to 16 show the formats of various messages exchanged between servers, or between terminals and servers, as listed below:

FIG. 7—Format of activation request messages between servers.

FIG. 8—Format of activation response messages between servers.

Figure 9:
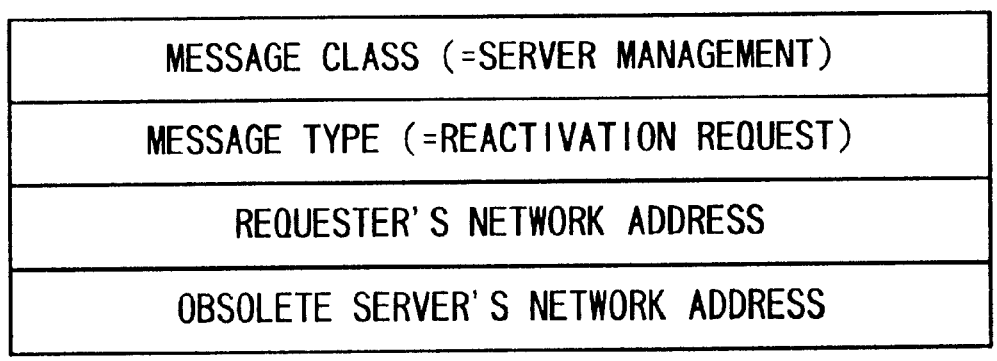
FIG. 9 is a diagram which shows the format of reactivation request messages used between servers.

FIG. 9—Format of reactivation request messages between servers.

FIG. 10—Format of reactivation response messages between servers.

Figure 11:
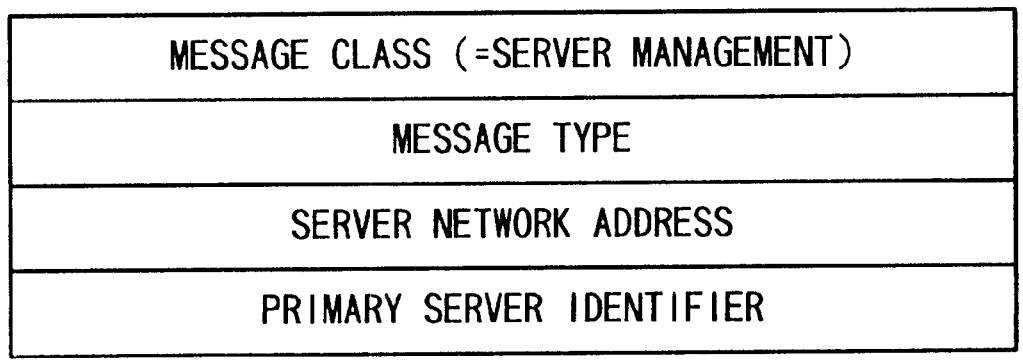
FIG. 11 is a diagram which shows the format of primary server information messages, primary server restoration messages, and primary server substitution messages used between servers.

FIG. 11—Format of primary server information messages, primary server restoration messages, and primary server substitution messages between servers.

FIG. 12—Format of secondary server information messages, secondary server restoration messages, and secondary server substitution messages between servers.

FIG. 13—General message format for the data retrieval, data registration, and search report message classes.

FIG. 14—Format of data registration request messages used between terminals and secondary servers.

FIG. 15—Format of data retrieval request messages used between terminals and secondary servers.

FIG. 16—Format of search report message used between terminals and secondary servers.

FIGS. 17 to 20 illustrate the contents of each data storage prepared in the servers for some specific purposes as listed below:

FIG. 17—Server information storage in the system supervisory server, where symbols "ID1" and "ID2" represent identifiers of primary servers and secondary servers, respectively.

FIG. 18—Server information storage in primary servers.

FIG. 19—Server information storage in secondary servers.

Figure 20:
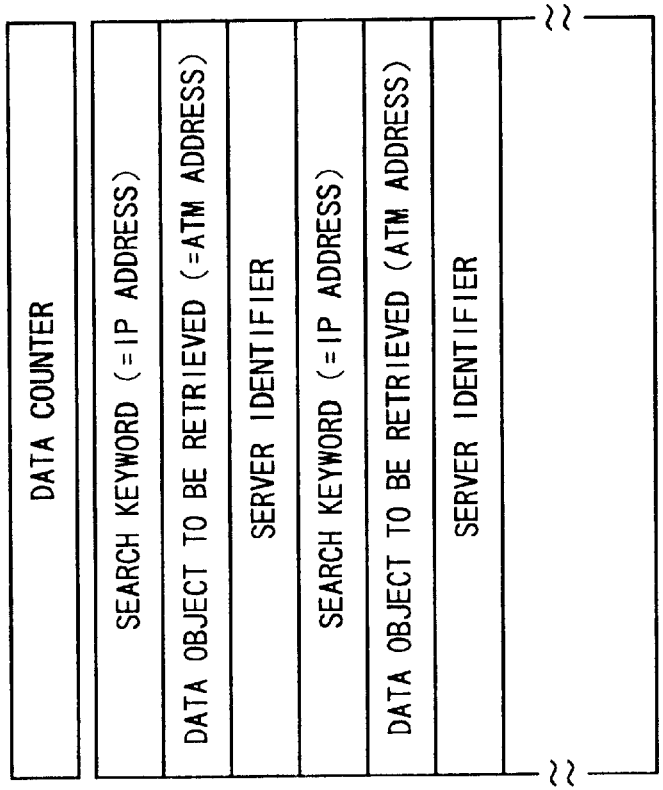
FIG. 20 is a diagram which shows the structure of regular data storage, local replicated data storage, remote replicated data storage, local backup data storage, and remote backup data storage, which are used to store data objects with search keyword information.

FIG. 20—Regular data storage, local replicated data storage, remote replicated data storage, local backup data storage, and remote backup data storage. (All those five storage areas are used to store search keywords and data objects to be retrieved with specific keywords, along with related server identifiers. This structure is common to primary servers and secondary servers.)

Figure 21:
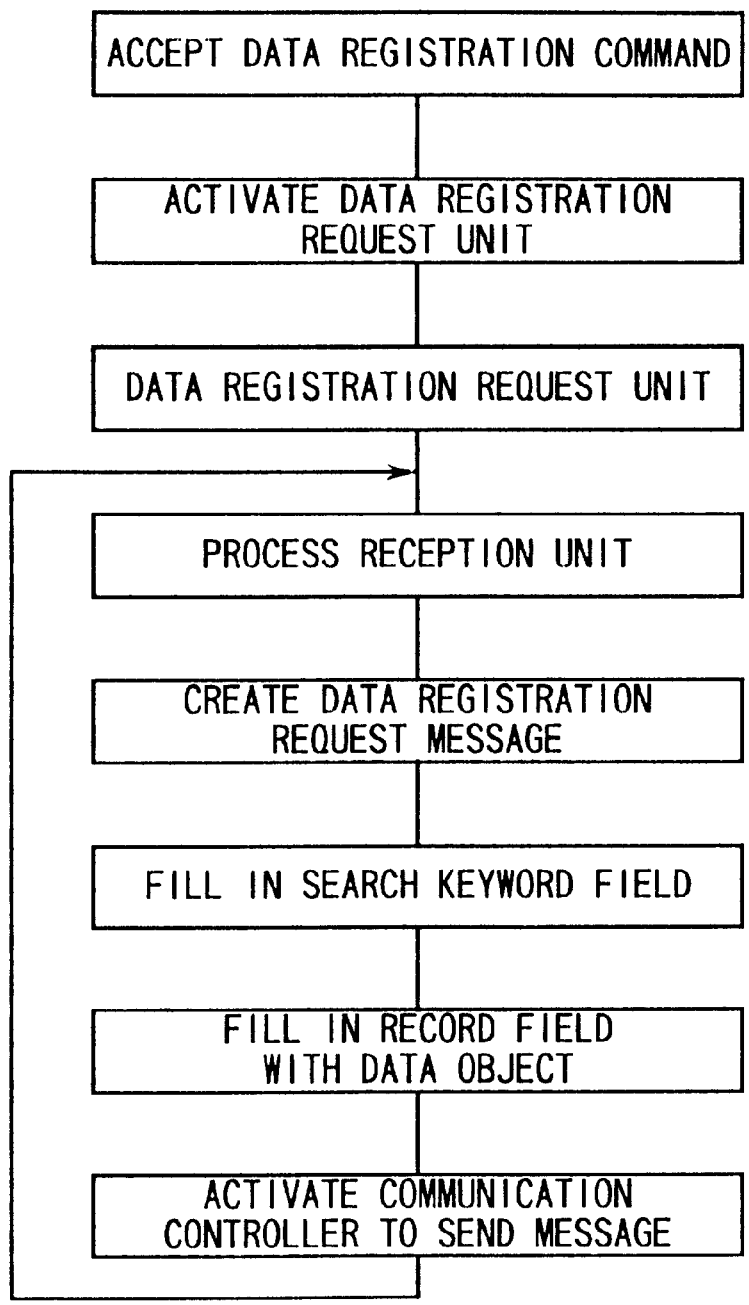
FIG. 21 is a flowchart which shows a process executed by a terminal when a data registration request has arisen.
Figure 22:
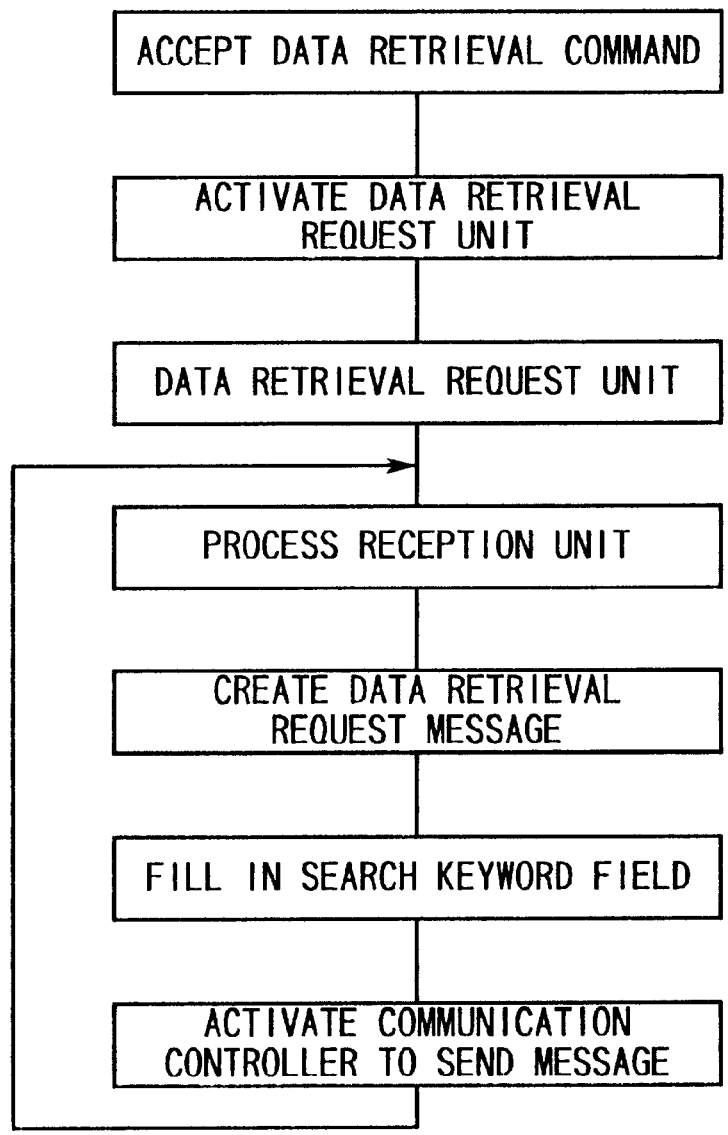
FIG. 22 is a flowchart which shows a process executed by a terminal when a data retrieval request has arisen.
Figure 23:
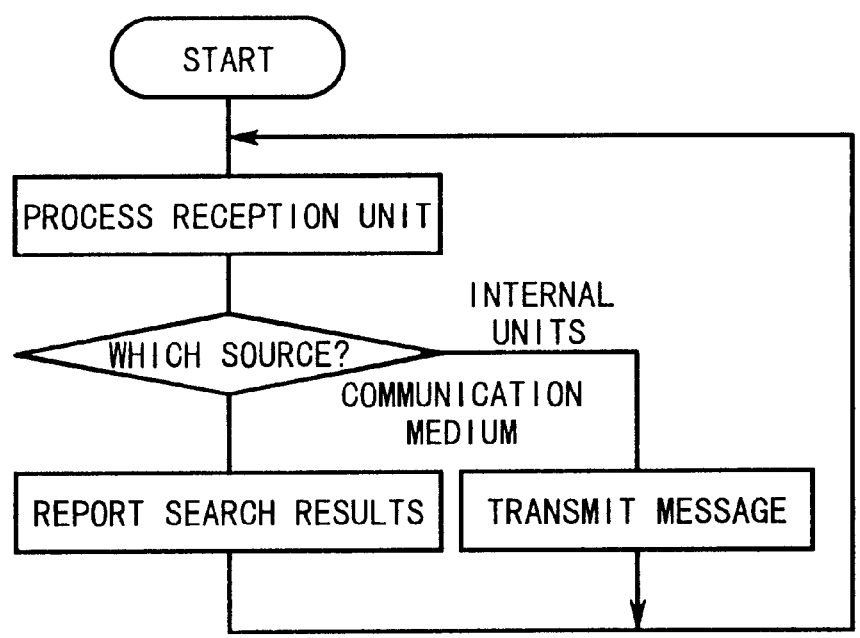
FIG. 23 is a flowchart which shows a process executed by a communication controller in a terminal.

FIGS. 21 to 23 are flowcharts which show various processes executed in the terminals.

FIG. 21—Process executed by the terminal when a data registration request has arisen.

FIG. 22—Process executed by the terminal when a data retrieval request has arisen.

FIG. 23—Process executed by the communication controller in each terminal.

FIGS. 24 to 27 are flowcharts which show various processes executed in the system supervisory server 0.

Figure 24:
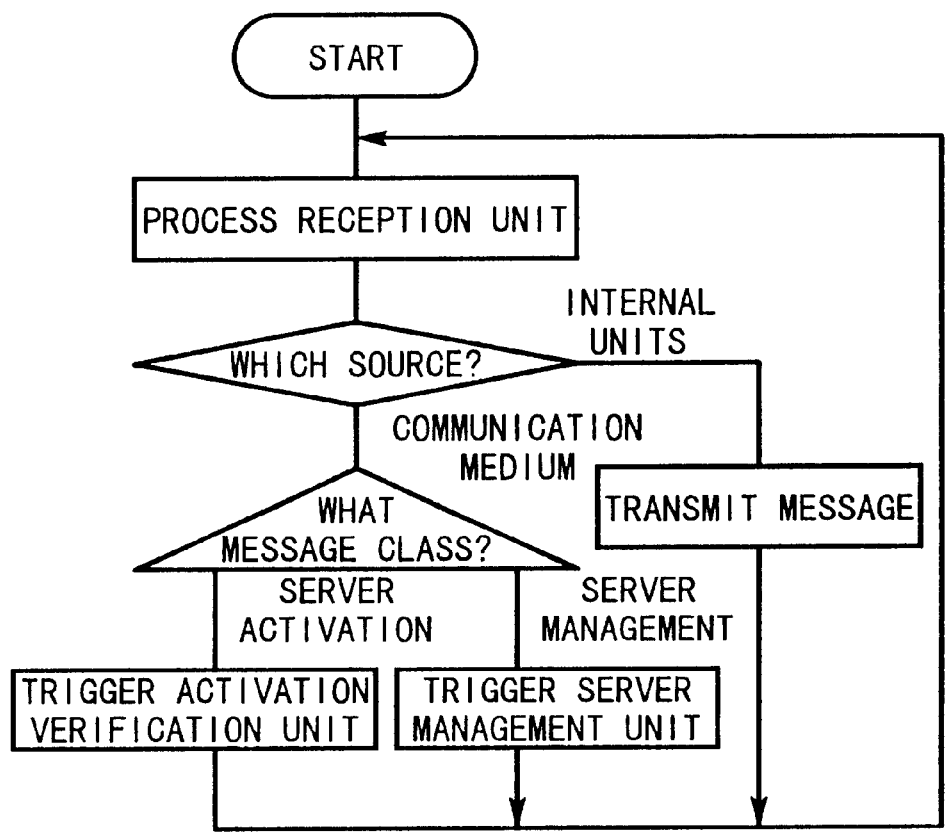
FIG. 24 is a flowchart which shows a process executed by a communication controller in a system supervisory server.

FIG. 24—Process executed by the communication controller.

Figure 25:
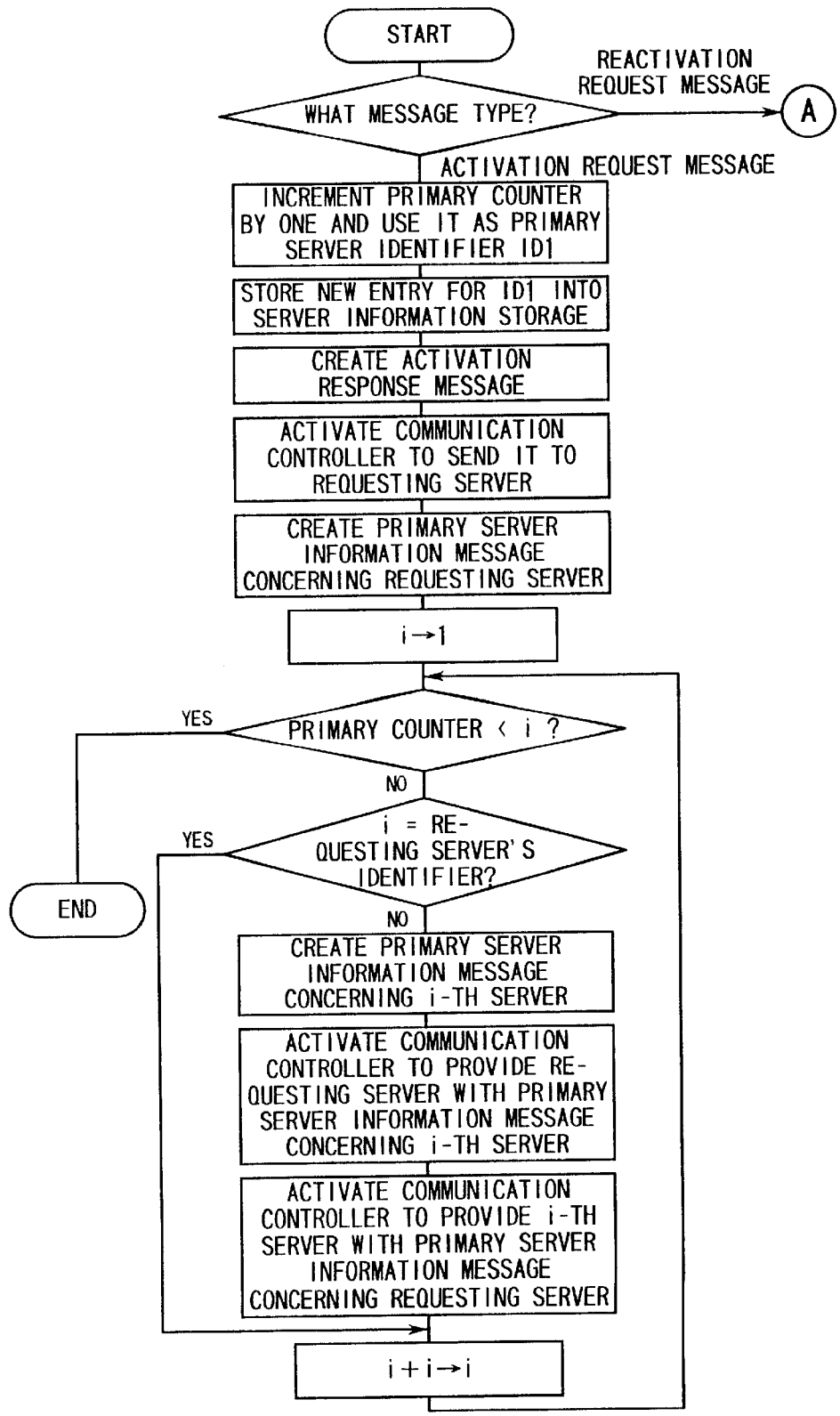
FIG. 25 is a flowchart which shows a process executed by an activation verification unit in a system supervisory server when starting up servers.

FIG. 25—Process executed by an activation verification unit when starting up a server.

Figure 26:
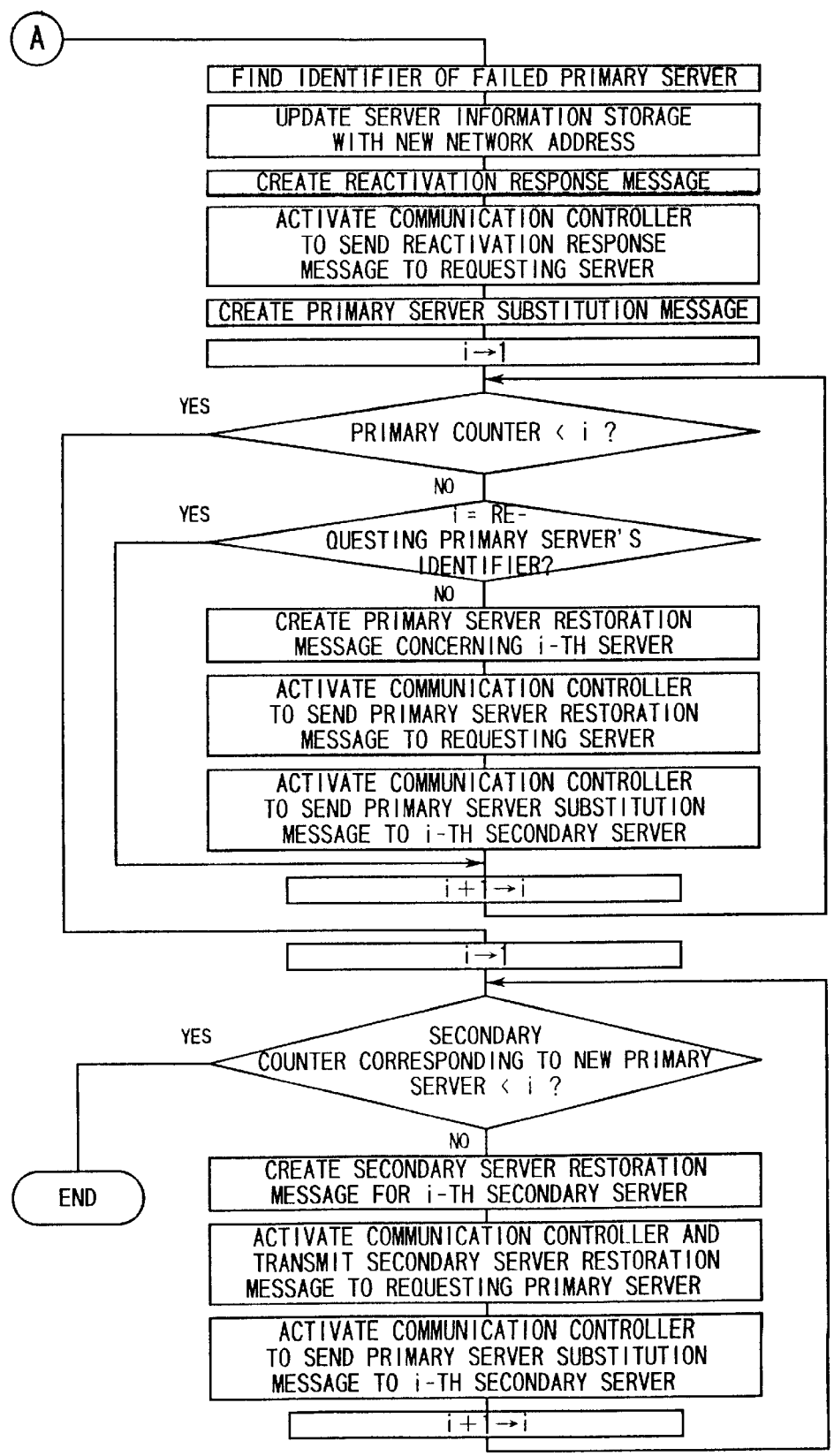
FIG. 26 is a flowchart which shows a process executed by an activation verification unit in a system supervisory server when reactivating servers.

FIG. 26—Process executed by an activation verification unit when reactivating a server.

Figure 27:
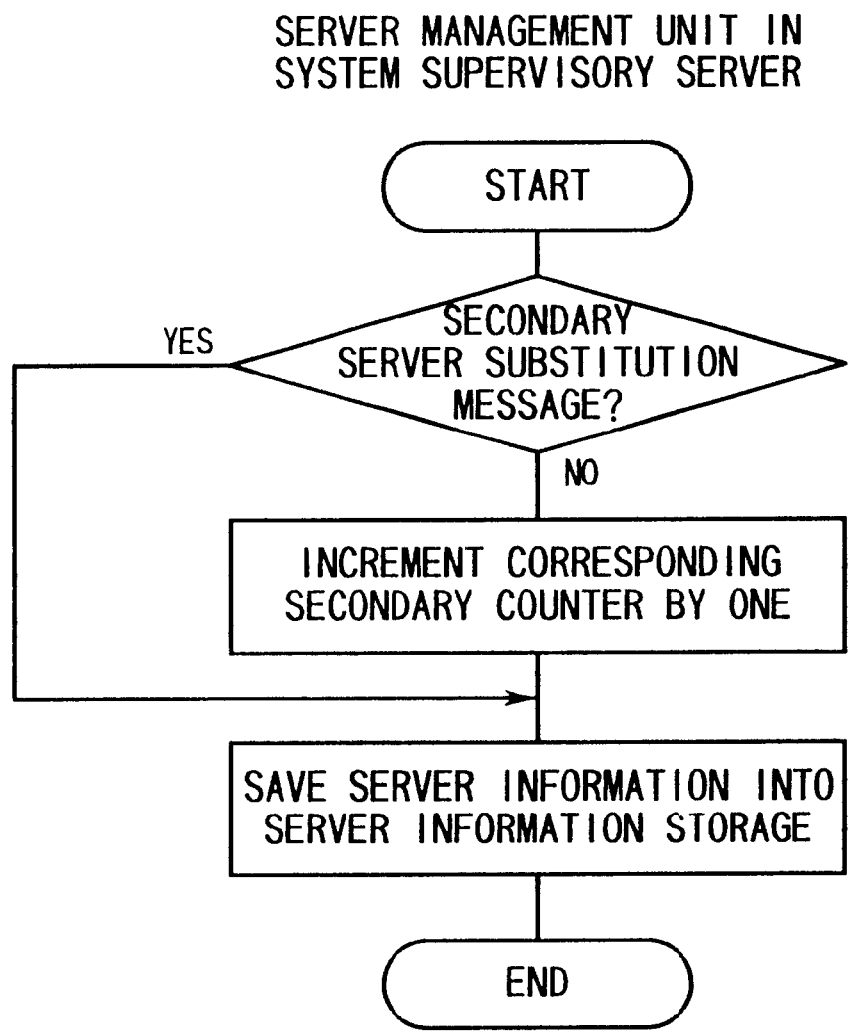
FIG. 27 is a flowchart which shows the process executed by a server management unit in the system supervisory server.
Figure 28:
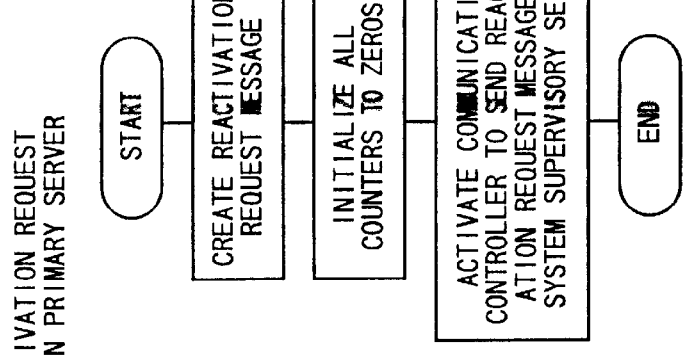
FIG. 28(A) is a flowchart which shows a process executed by a command parser in a primary server.
FIG. 28(B) is a flowchart which shows a process executed by an activation request unit in a primary server.
FIG. 28(C) is a flowchart which shows a process executed by a reactivation request unit in a primary server.
Figure 28:
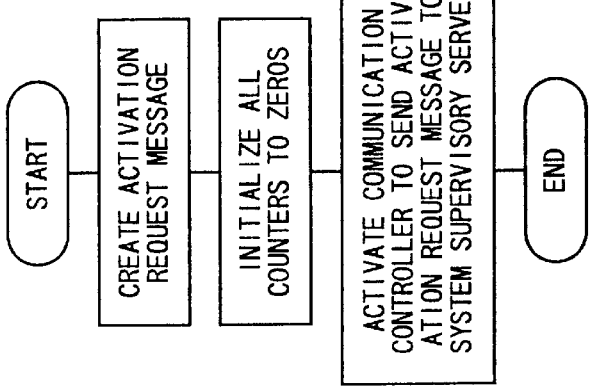
Figure 28:
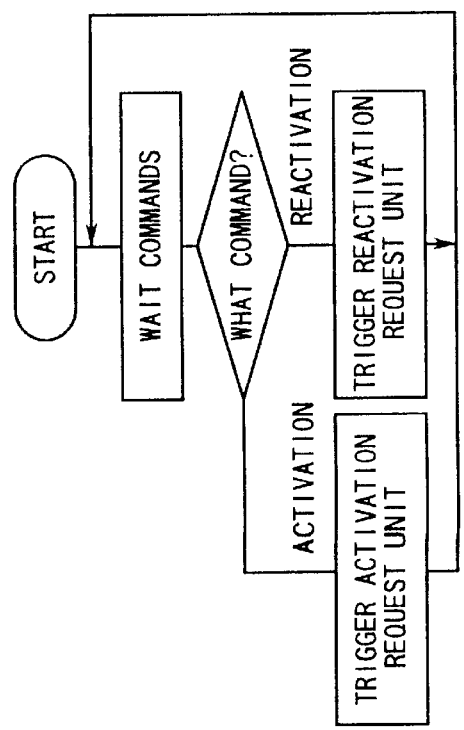

FIG. 27—Process executed by the server management unit.

FIGS. 28(A) to 36 are flowcharts which show various processes executed in each primary server.

FIG. 28(A)—Process executed by the command parser.

FIG. 28(B)—Process executed by the activation request unit.

FIG. 28(C)—Process executed by the reactivation request unit.

Figure 29:
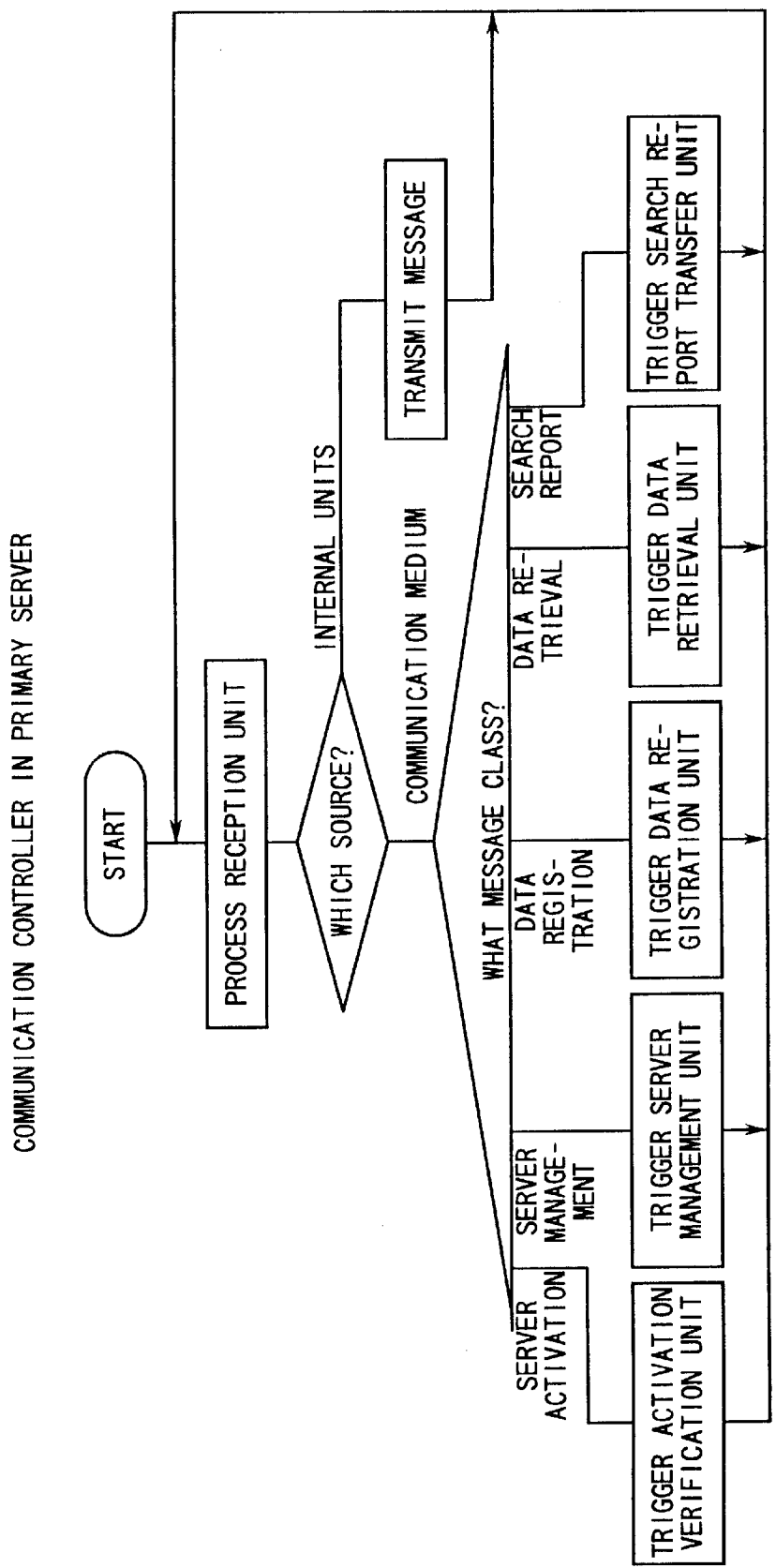
FIG. 29 is a flowchart which shows a process executed by a communication controller in a primary server.

FIG. 29—Process executed by the communication controller.

Figure 30:
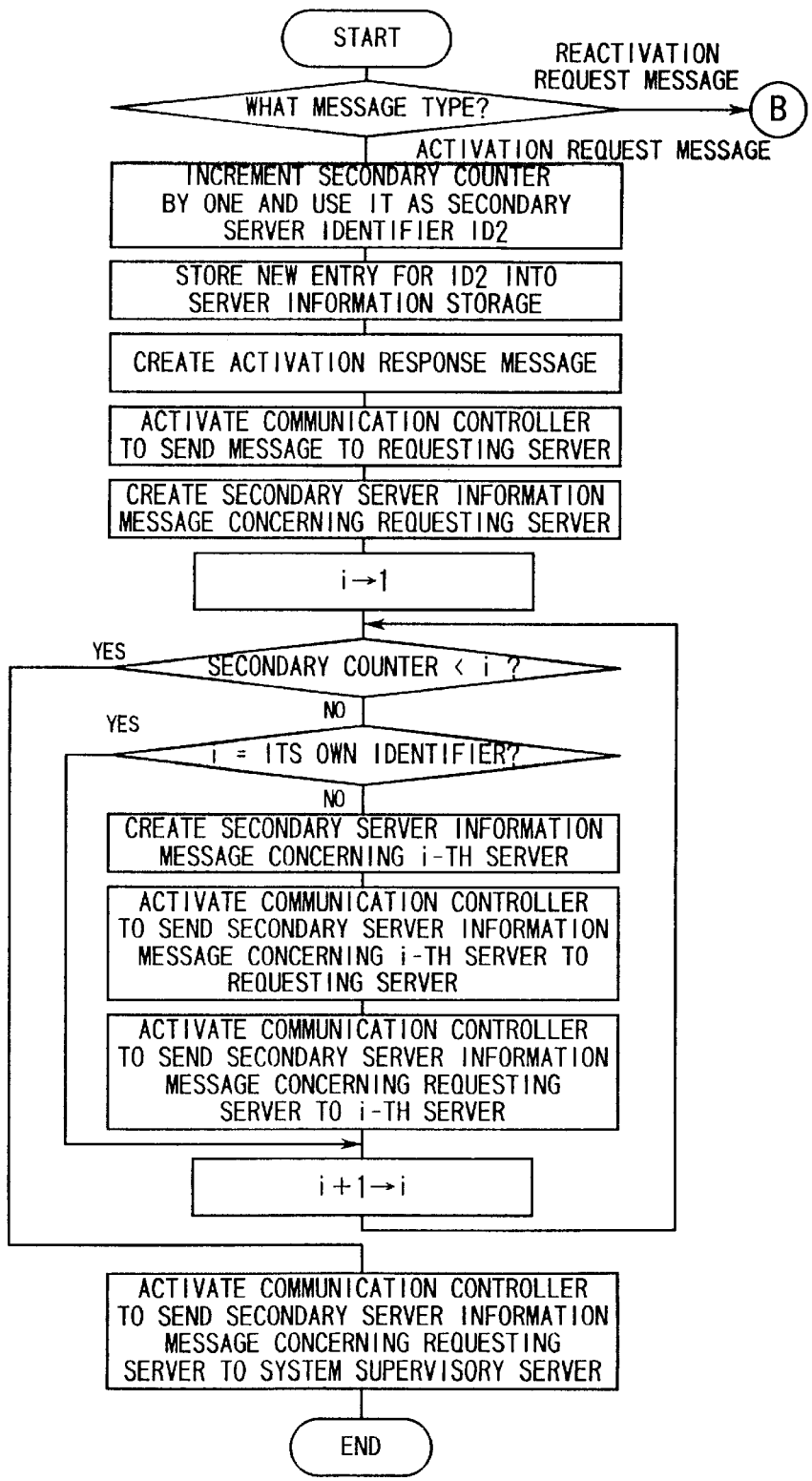
FIG. 30 is a flowchart which shows a process executed by an activation verification unit in a primary server when server activation is requested.

FIG. 30—Process executed by the activation verification unit when server activation is requested.

Figure 31:
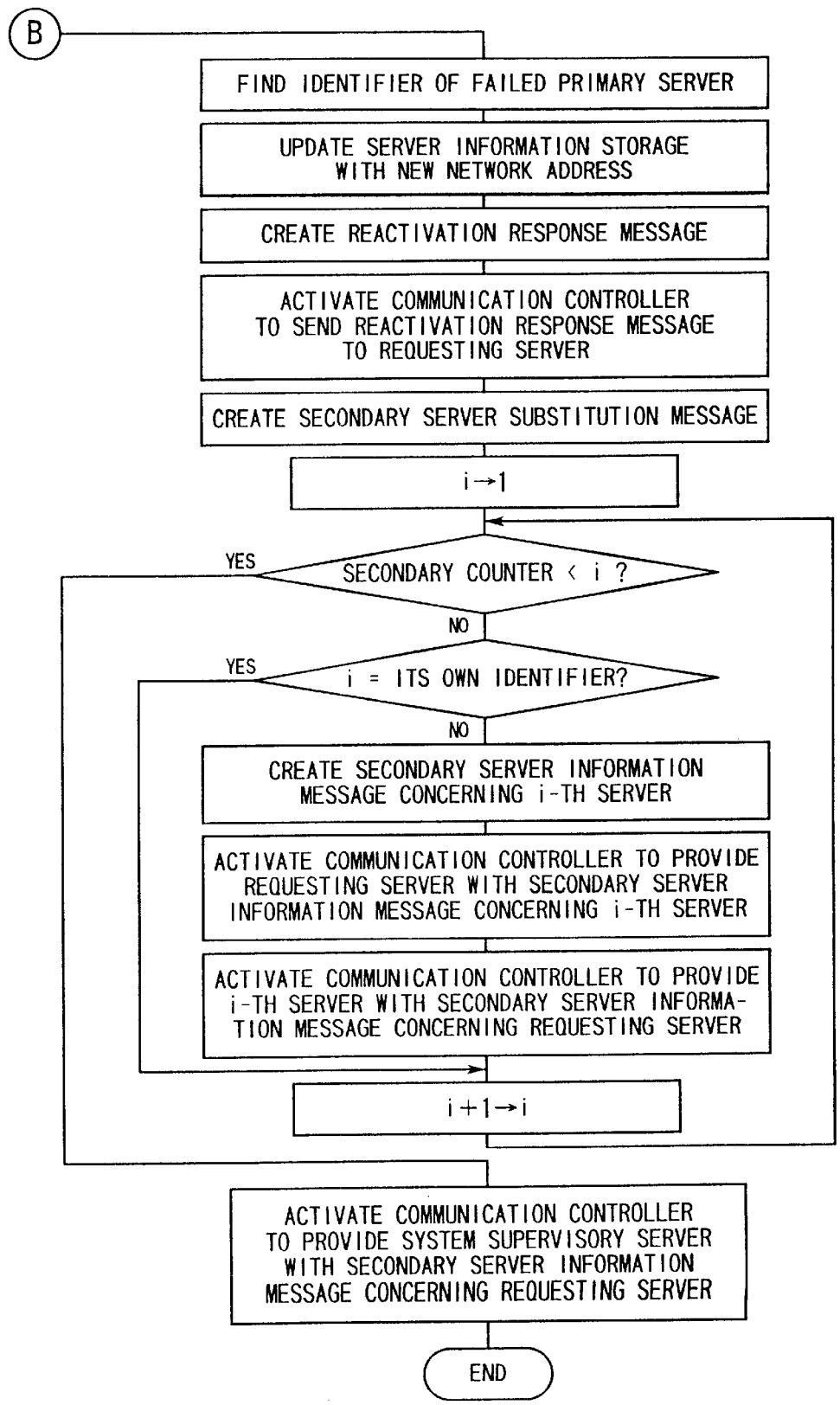
FIG. 31 is a flowchart which shows a process executed by an activation verification unit in a primary server when server reactivation is requested.

FIG. 31—Process executed by the activation verification unit when server reactivation is requested.

Figure 32:
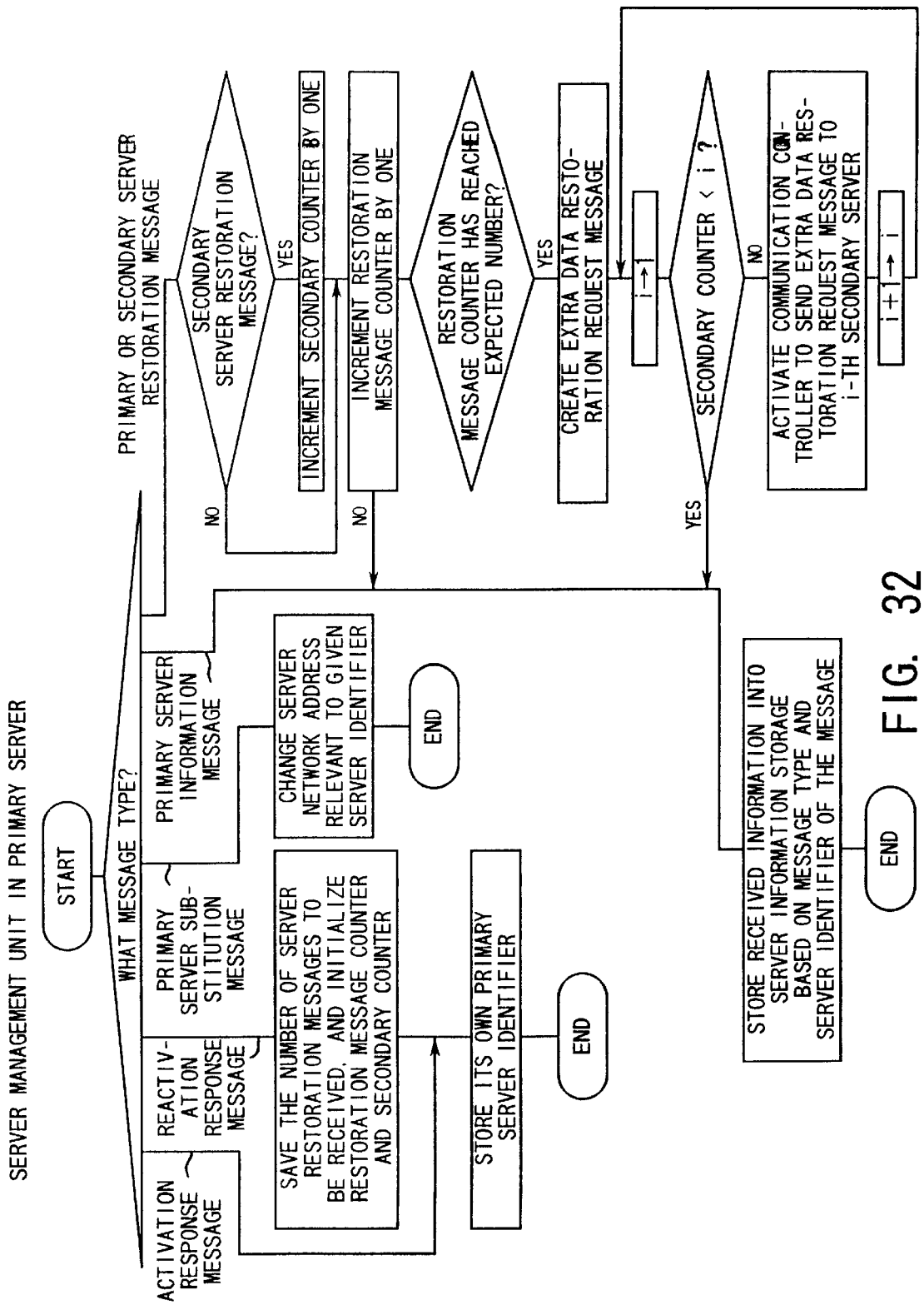
FIG. 32 is a flowchart which shows a process executed by a server management unit in a primary server.

FIG. 32—Process executed by the server management unit.

Figure 33:
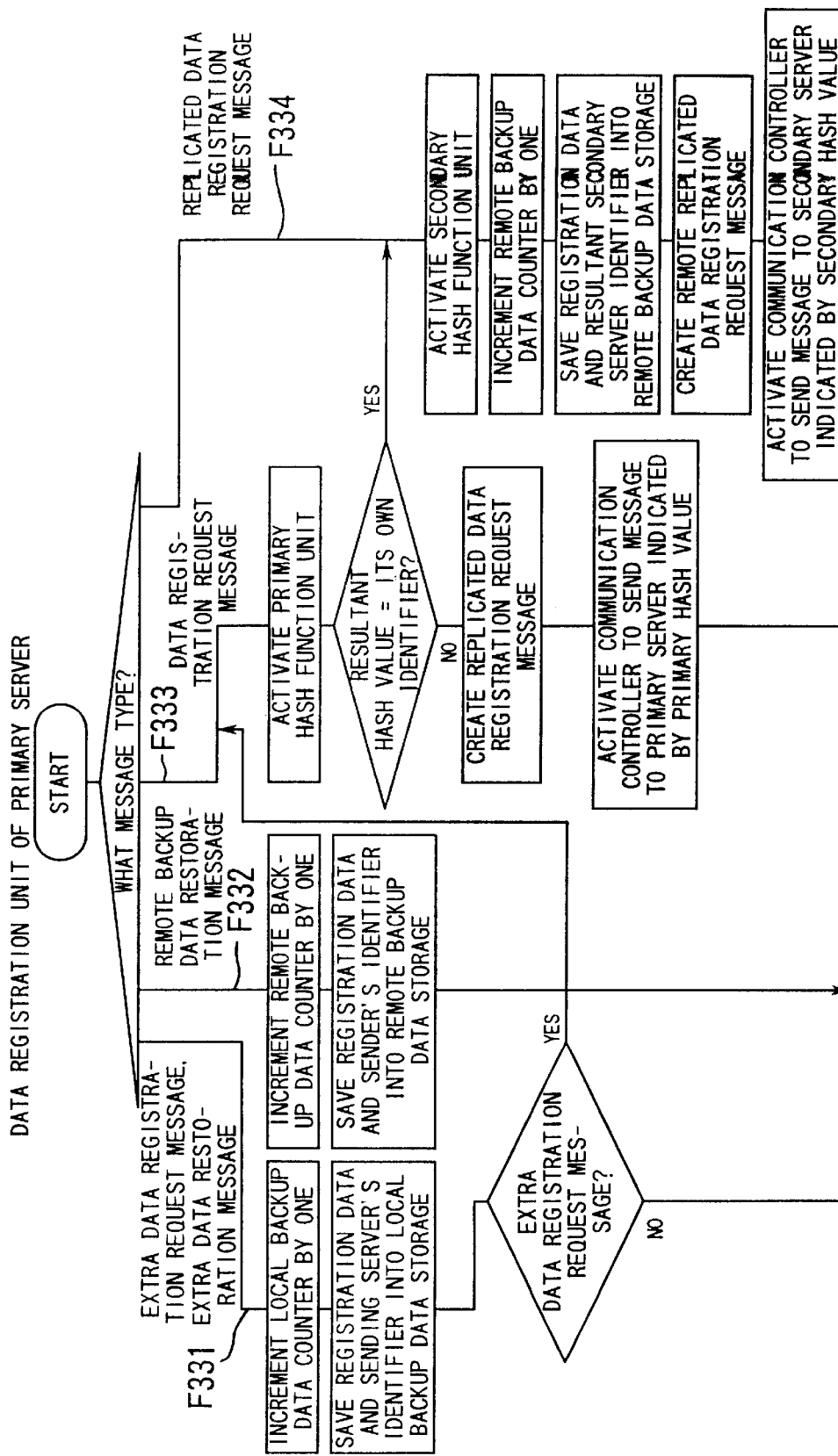
FIG. 33 is a flowchart which shows a process executed by a data registration unit in a primary server.

FIG. 33—Process executed by the data registration unit.

Figure 34:
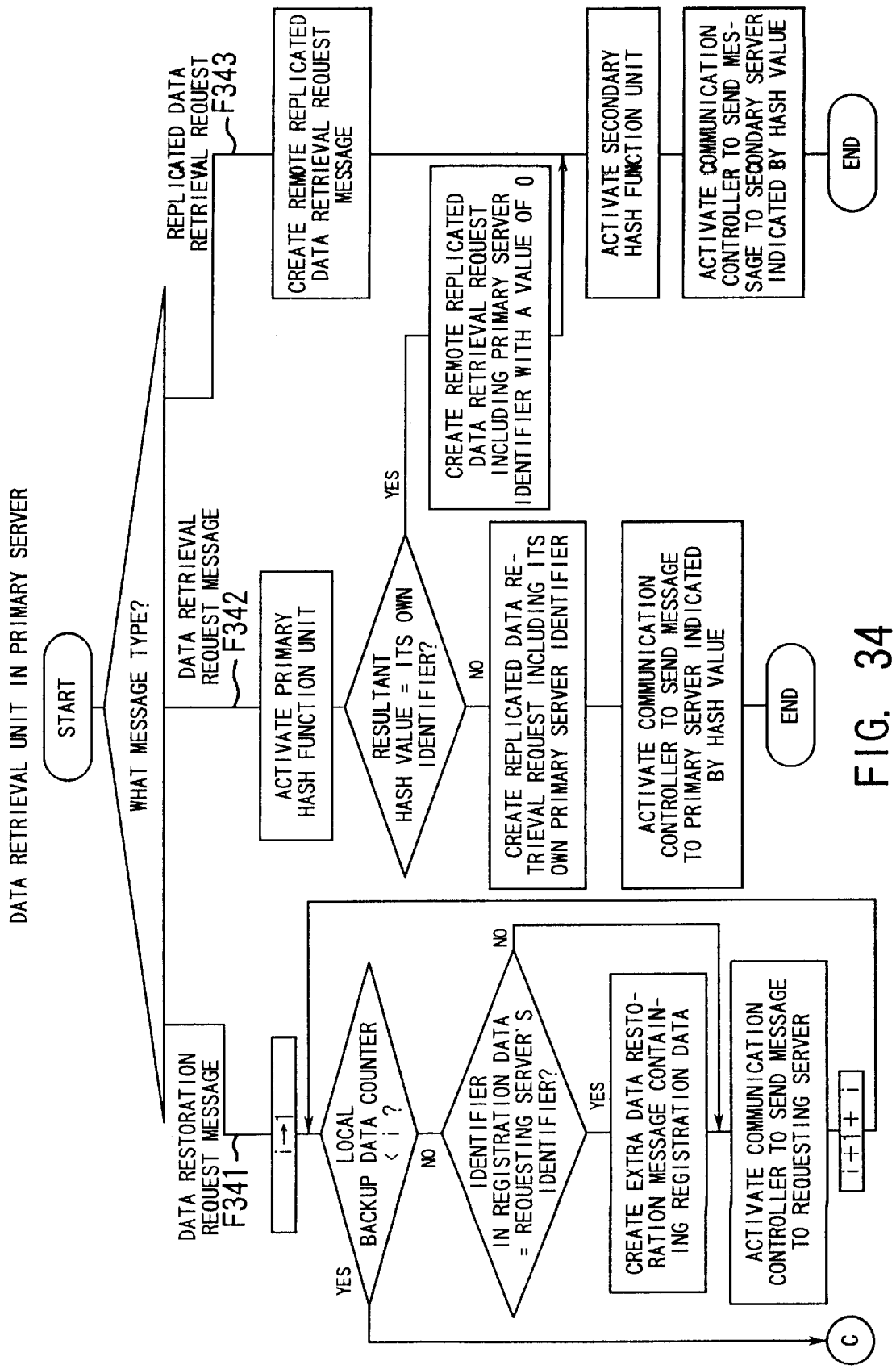
FIG. 34 is a flowchart which shows the first half of a process executed by a data retrieval unit in a primary server.

FIG. 34—The first half of a process executed by the data retrieval unit.

Figure 35:
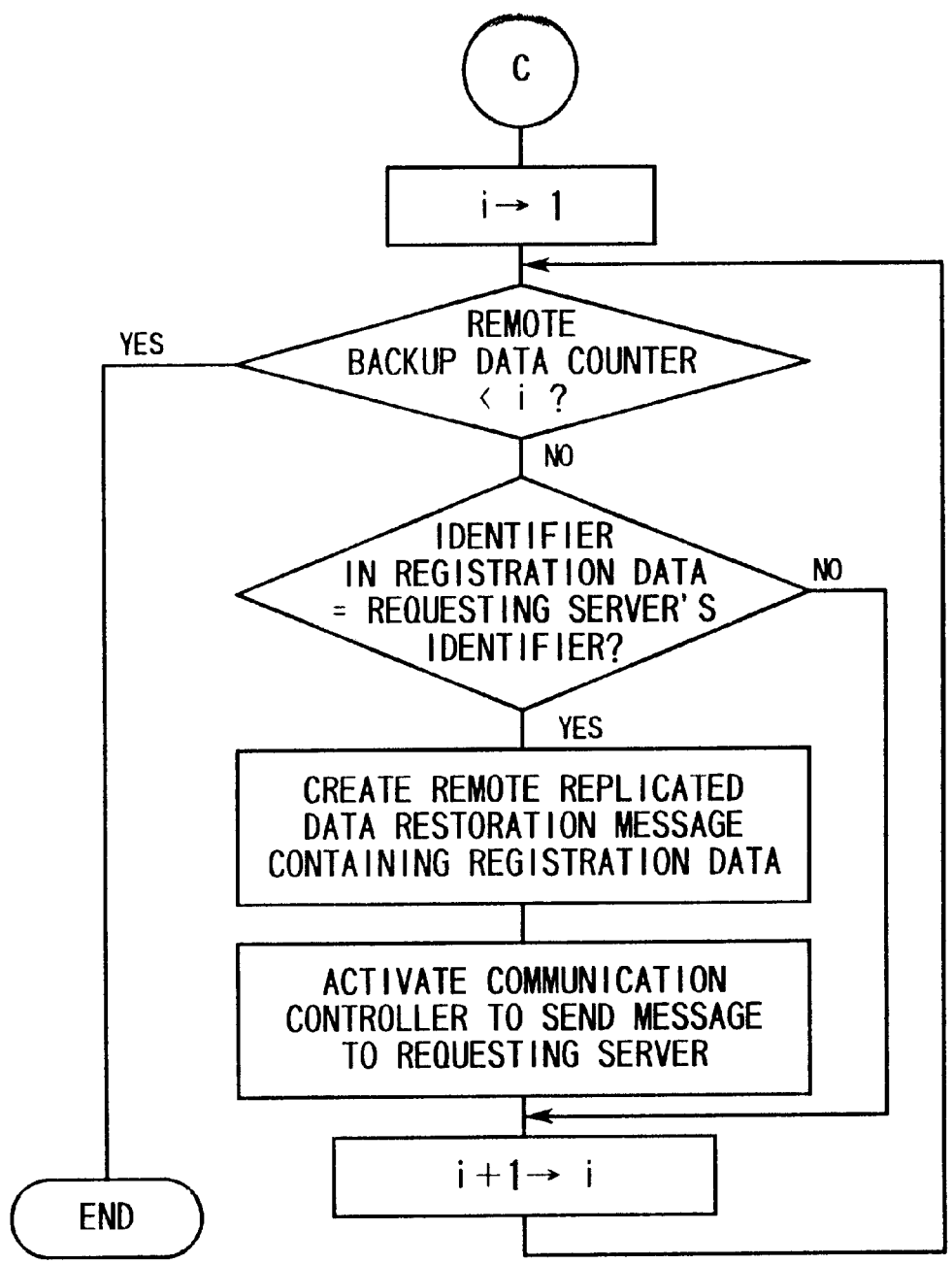
FIG. 35 is a flowchart which shows the second half of the process executed by the data retrieval unit.

FIG. 35—The second half of the process executed by the data retrieval unit.

Figure 36:
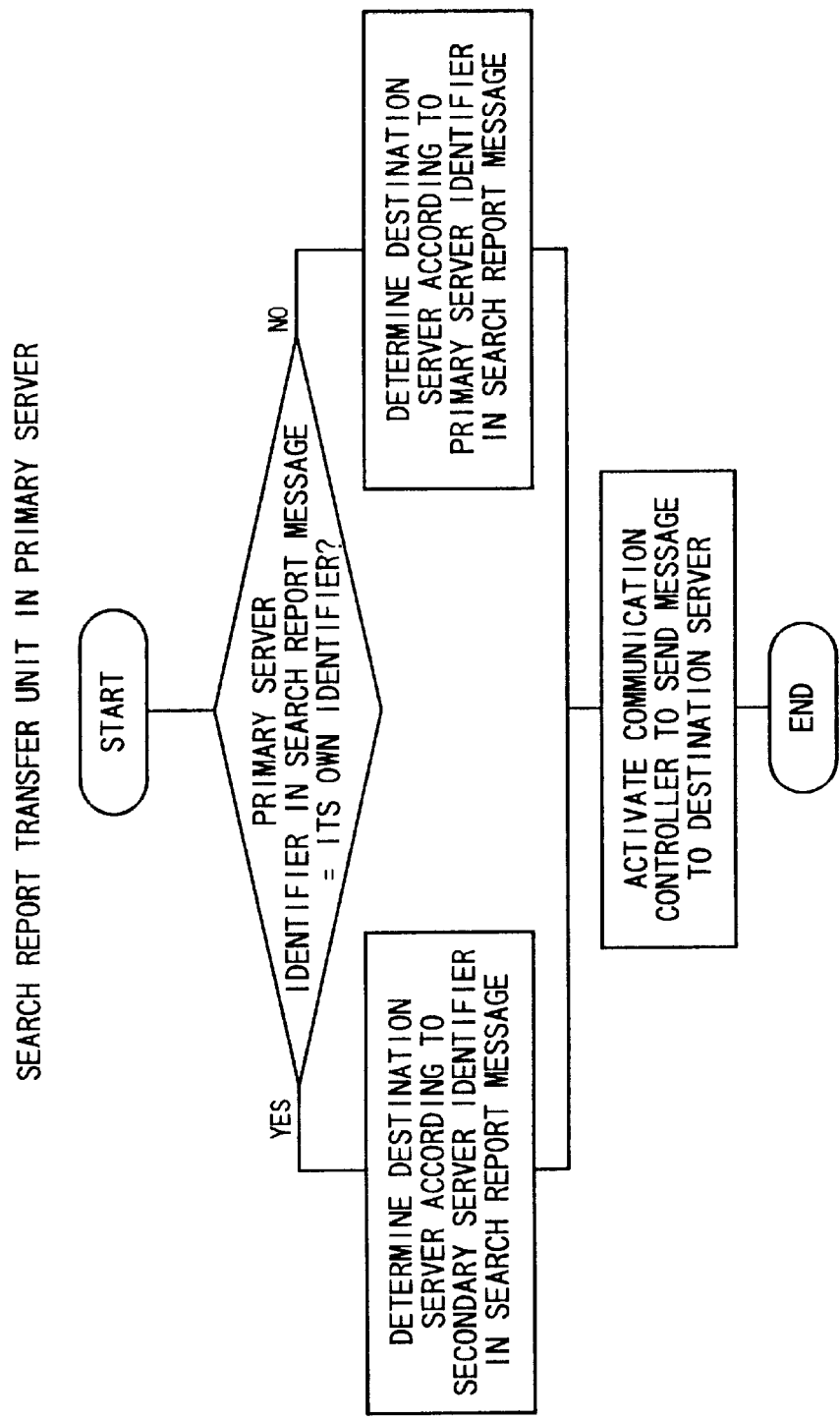
FIG. 36 is a flowchart which shows a process executed by a search report transfer unit in a primary server.
Figure 37:
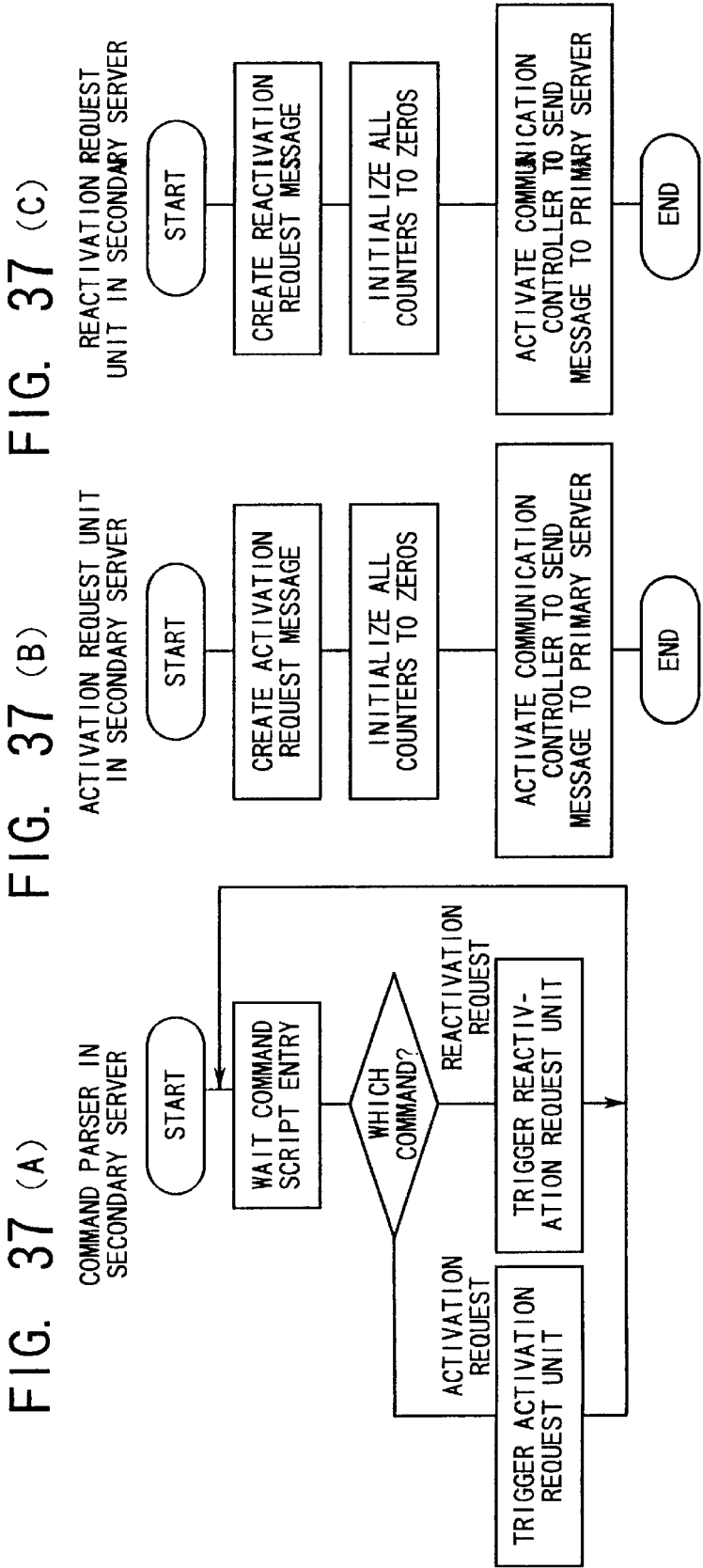
FIG. 37(A) is a flowchart which shows a process executed by a command parser in a secondary server.
FIG. 37(B) is a flowchart which shows a process executed by an activation request unit in a secondary server.
FIG. 37(C) is a flowchart which shows a process executed by a reactivation request unit in a secondary server.

FIG. 36—Process executed by the search report transfer unit.

FIGS. 37(A) to 45 are flowcharts which show various processes executed in each secondary server.

FIG. 37(A)—Process executed by the command parser.

FIG. 37(B)—Process executed by the activation request unit.

FIG. 37(C)—Process executed by the reactivation request unit.

Figure 38:
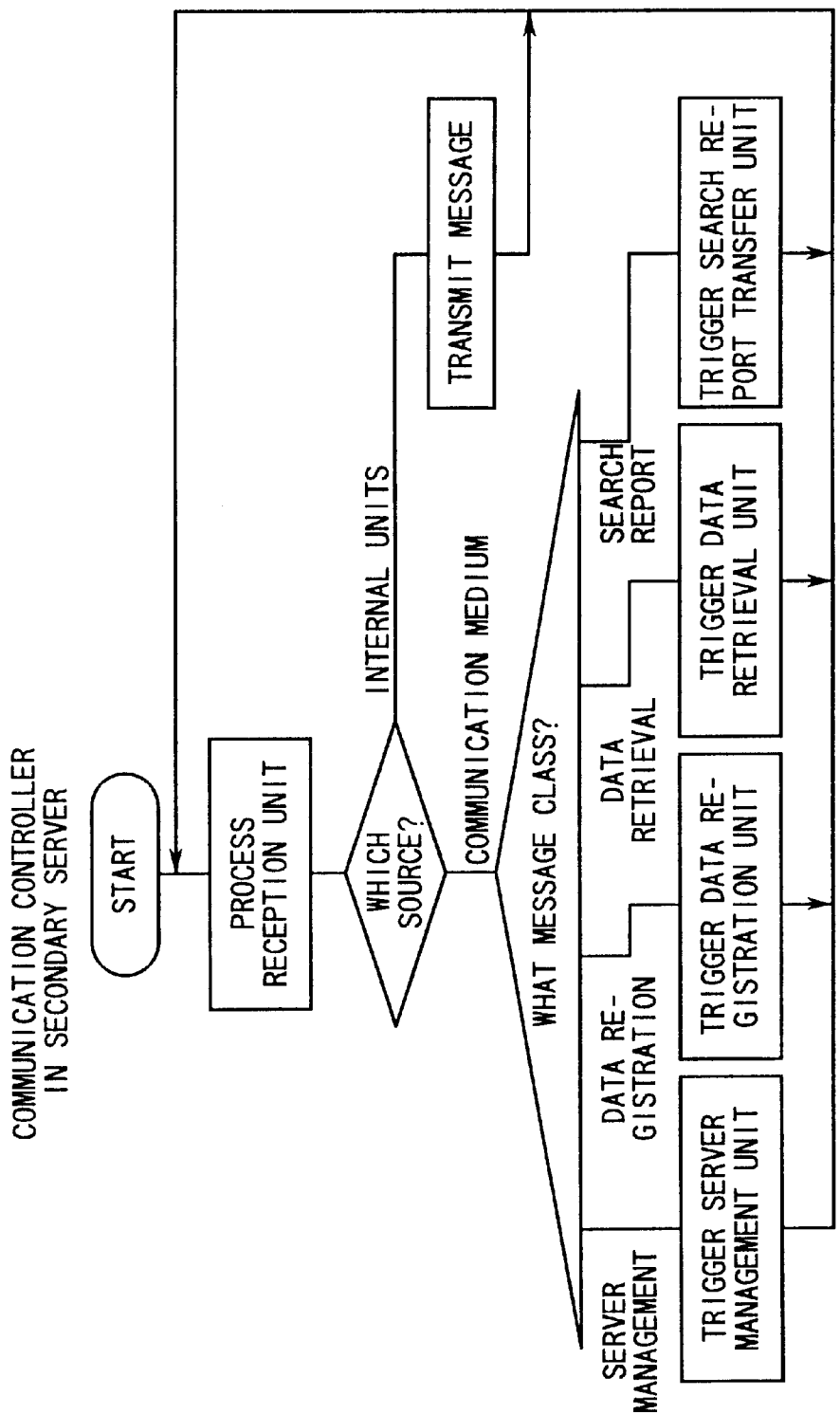
FIG. 38 is a flowchart which shows a process executed by a communication controller in a secondary server.

FIG. 38—Process executed by the communication controller.

Figure 39:
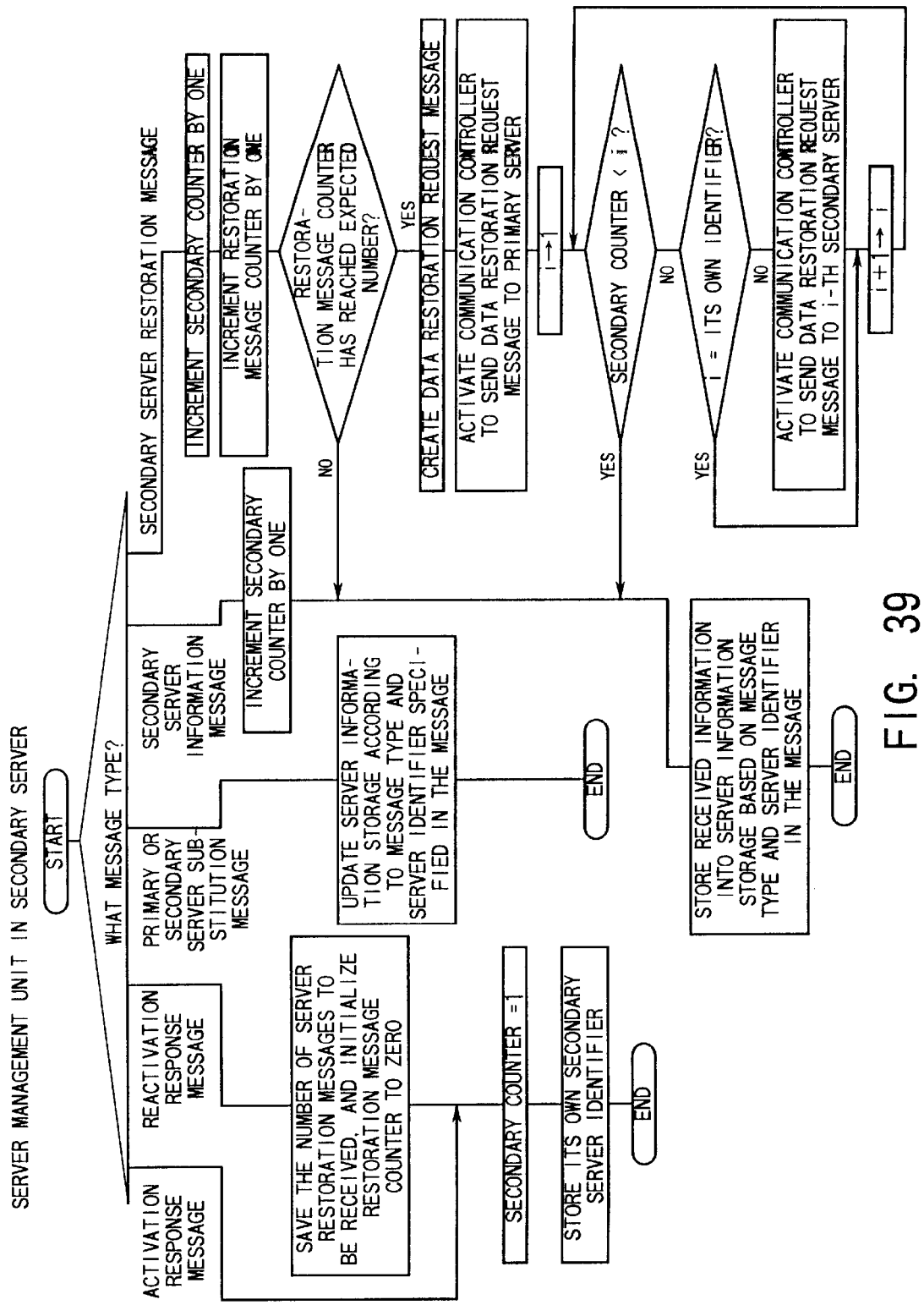
FIG. 39 is a flowchart which shows a process executed by a server management unit in a secondary server.

FIG. 39—Process executed by the server management unit.

Figure 40:
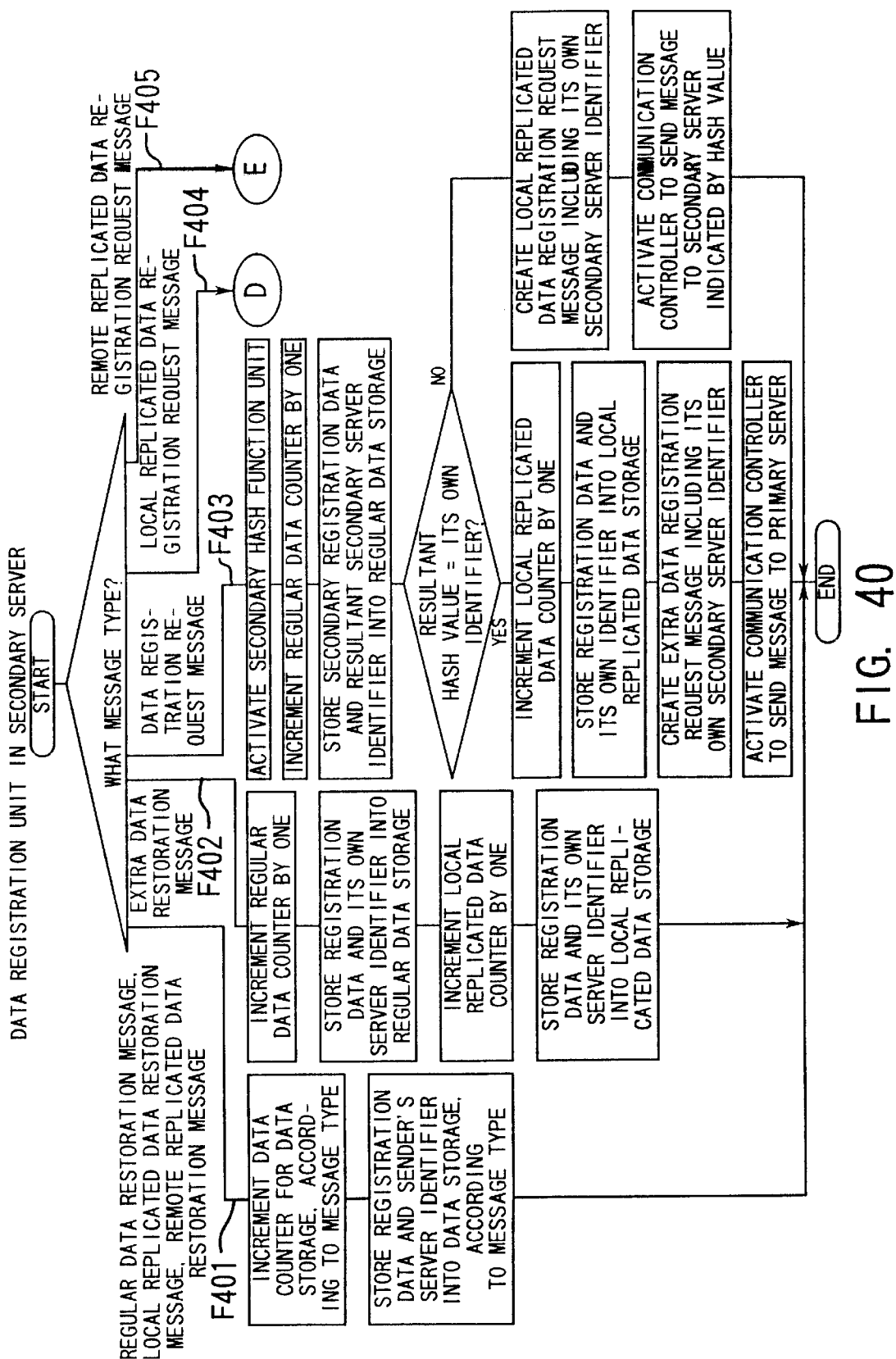
FIG. 40 is a flowchart which shows a part of a process executed by a data registration unit in a secondary server.

FIG. 40—The first part of a process executed by the data registration unit.

Figure 41:
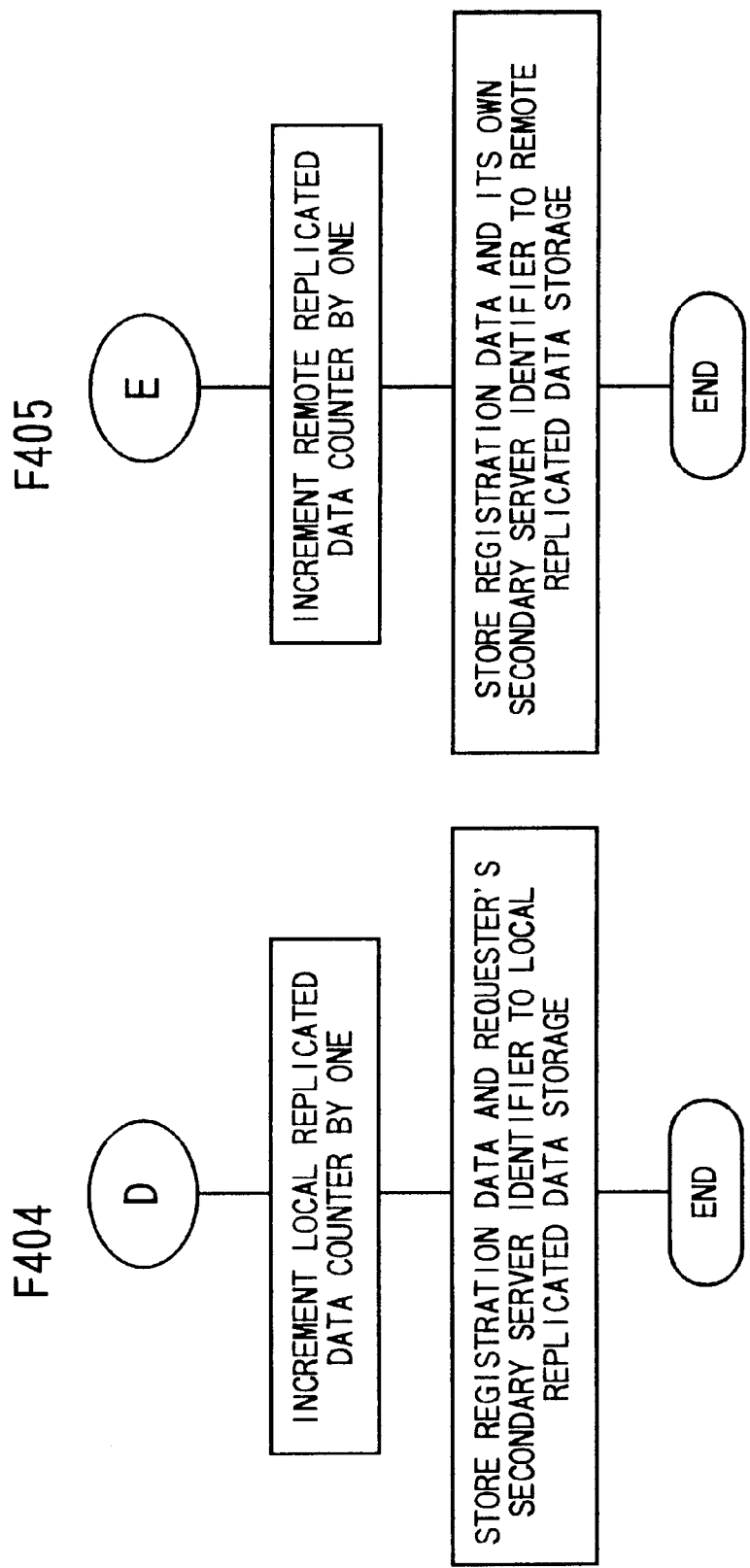
FIG. 41 is a flowchart which shows the rest of the process executed by the data registration unit.

FIG. 41—The second of the process executed by the data registration unit.

Figure 42:
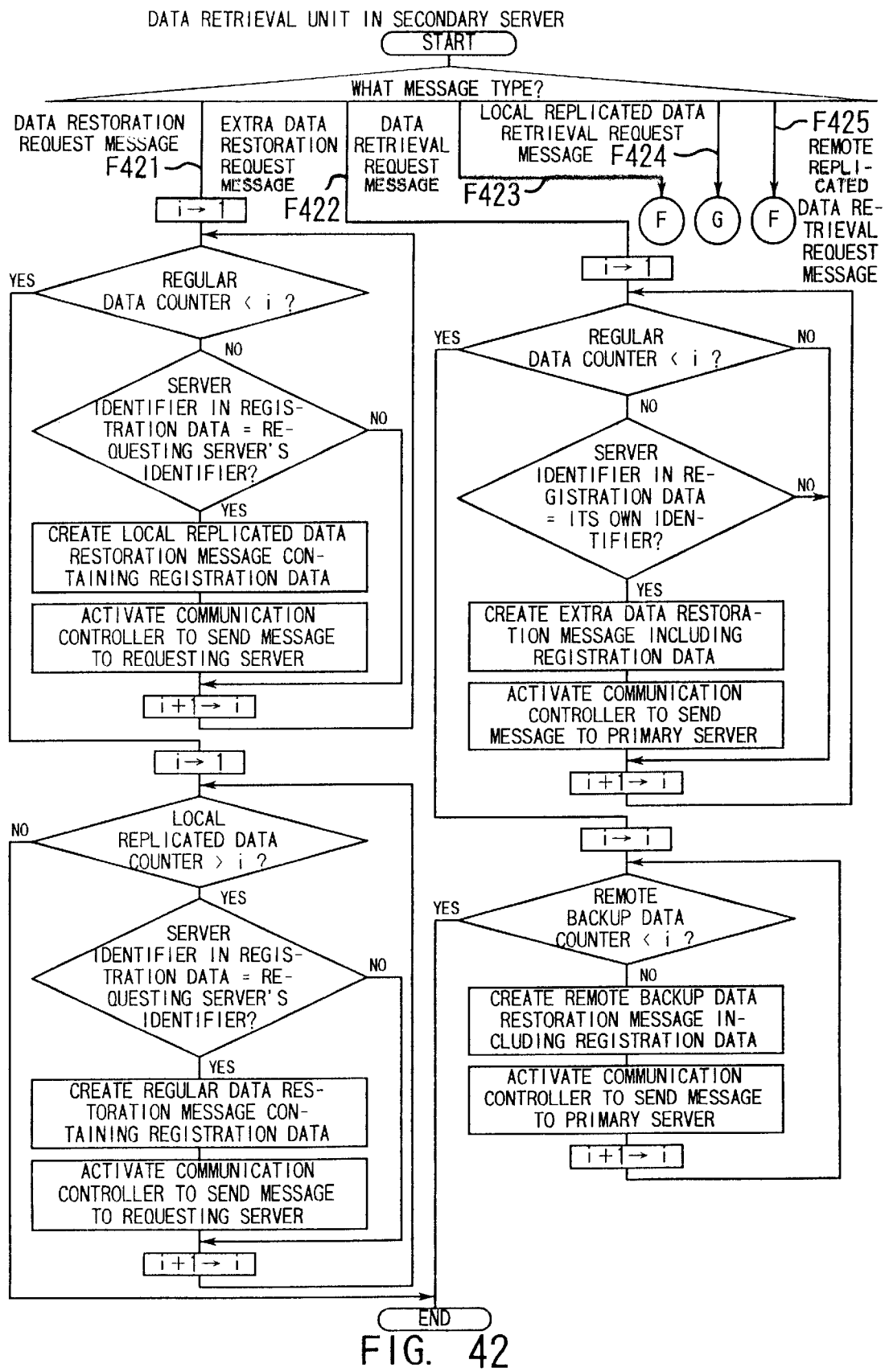
FIG. 42 is a flowchart which shows the first part of a process executed by a data retrieval unit in a secondary server.

FIG. 42—The first part of a process executed by the data retrieval unit.

Figure 43:
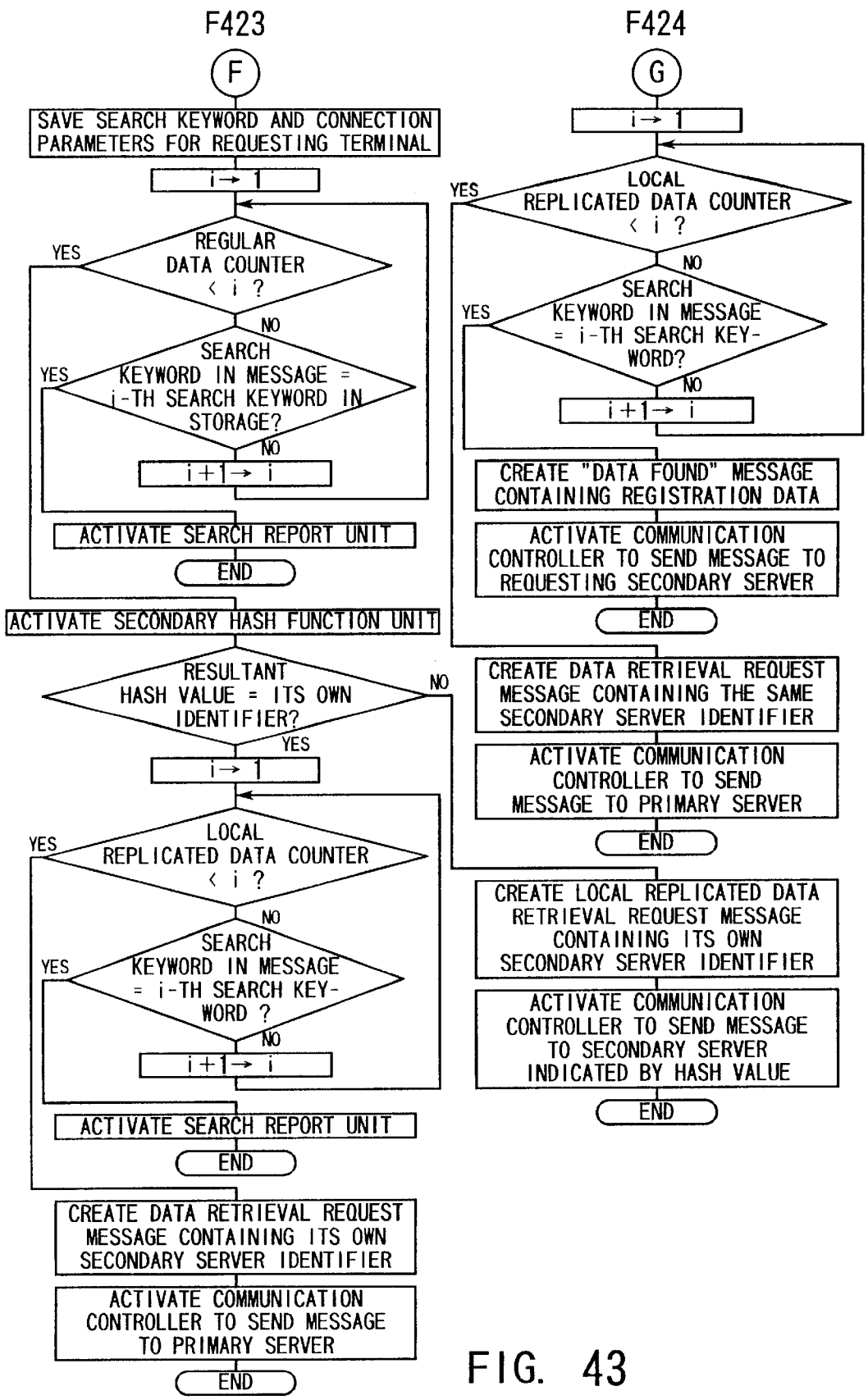
FIG. 43 is a flowchart which shows the second part of the process executed by the data retrieval unit.

FIG. 43—The second part of the process executed by the data retrieval unit.

Figure 44:
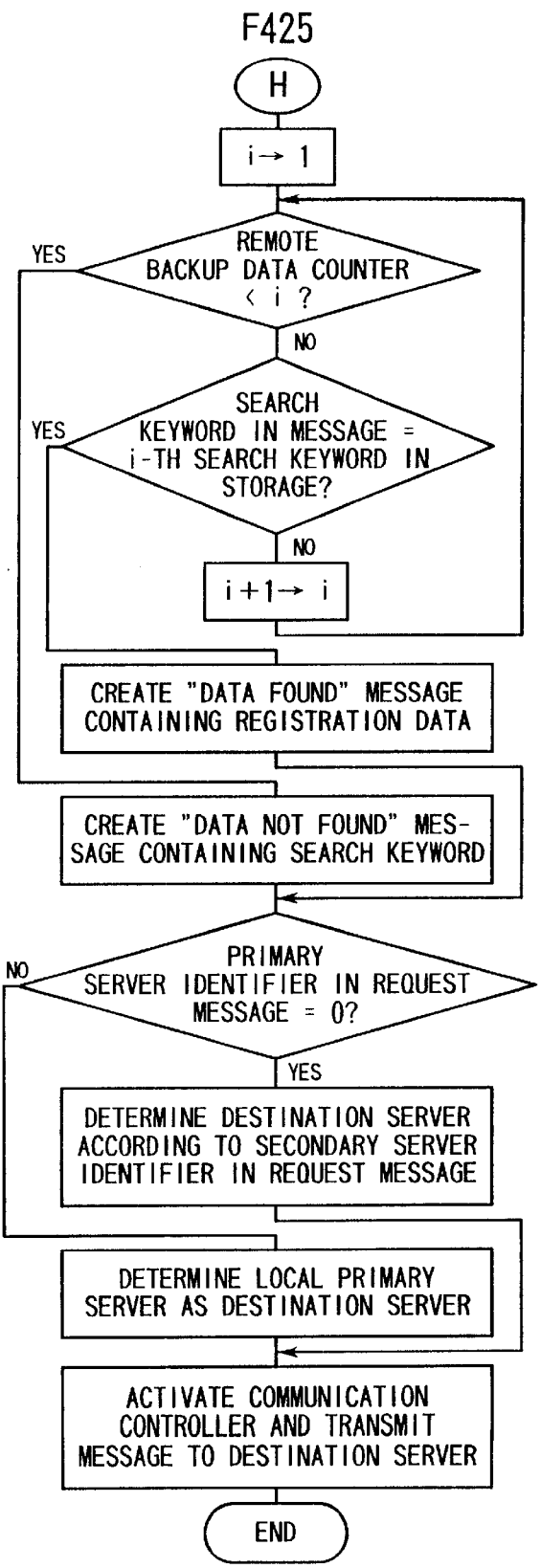
FIG. 44 is a flowchart which shows the third part of the process executed by the data retrieval unit.

FIG. 44—The third part of the process executed by the data retrieval unit.

Figure 45:
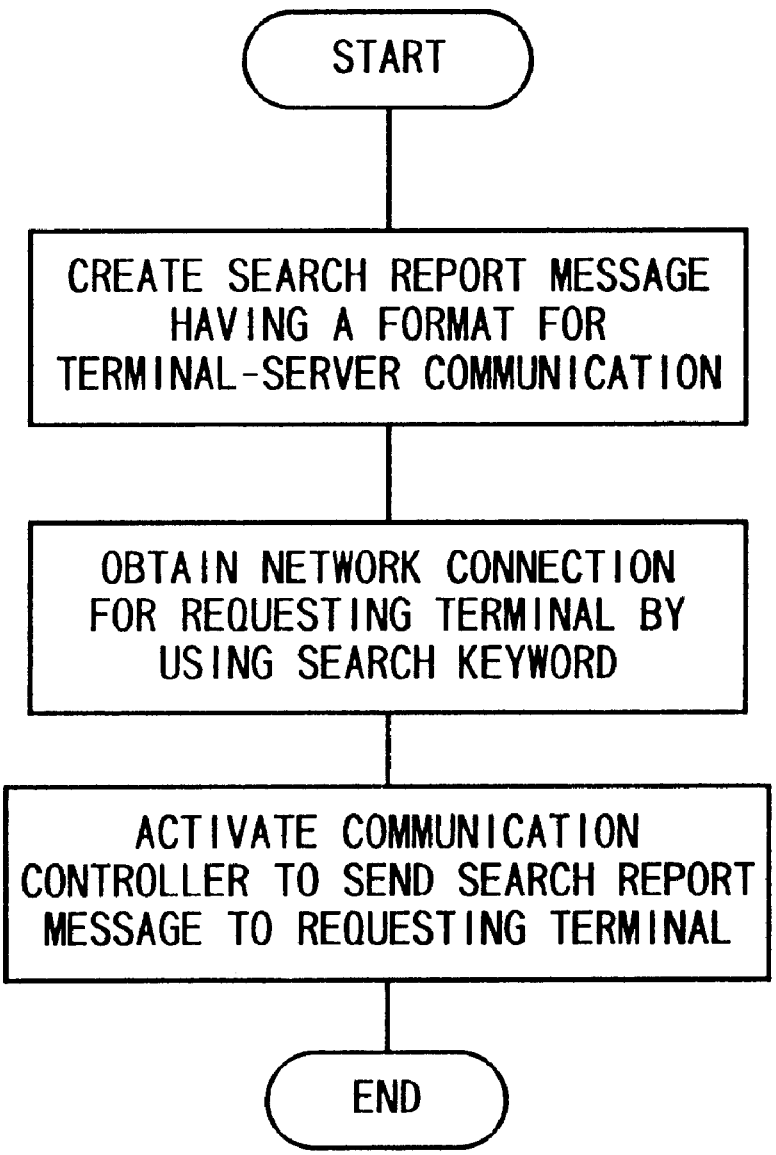
FIG. 45 is a flowchart which shows a process executed by a search report unit in a secondary server.
Figure 50:
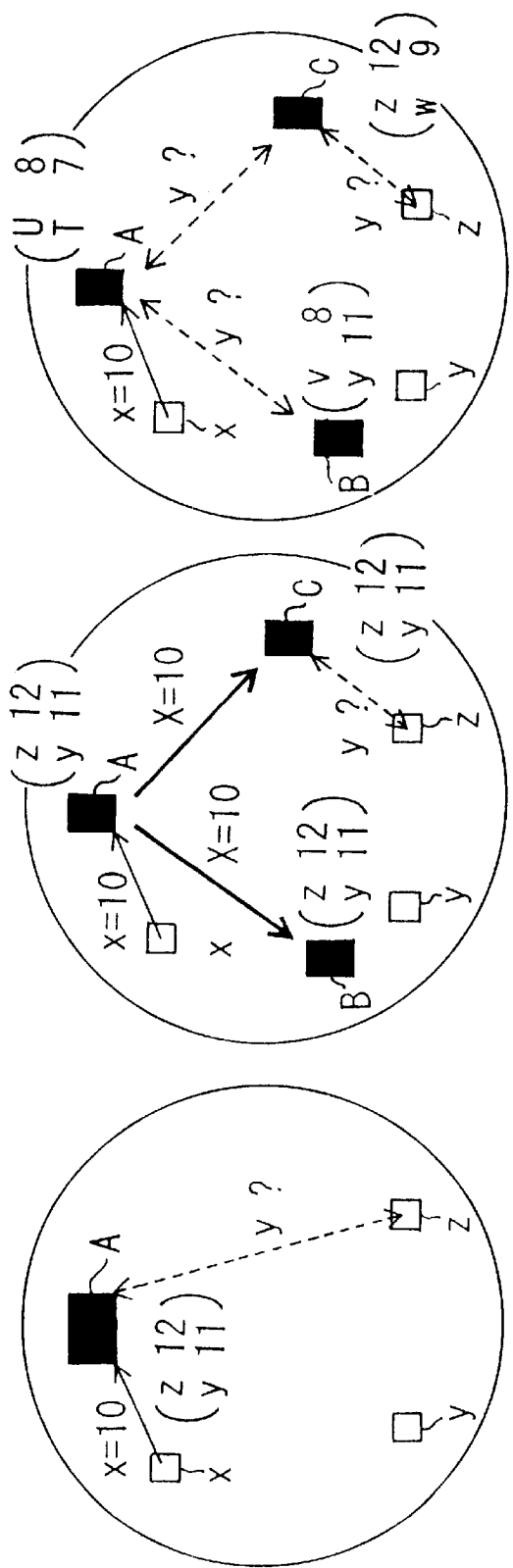
FIG. 50(A) is a diagram which shows the configuration of a first conventional data management system.
FIG. 50(B) is a diagram which shows the configuration of a second conventional data management system.
FIG. 50(C) is a diagram which shows the configuration of a third conventional data management system.

FIG. 45—Process executed by the search report unit.

Referring now to the above flowcharts, the operation of the data management system will be described below. The explanation will be provided in five separate sections, which include:

(A) Primary Server Activation Process, (B) Secondary Server Activation Process, (C) Data Registration Process, (D) Data Retrieval Process, and (E) Data Restoration Process.

Although above-listed flowcharts of FIGS. 21 to 45 describe the operation of each individual functional unit employed in the terminals or servers, the explanation for the processes (A) to (E) will proceed by referring simultaneously to a plurality of flowcharts.

Figure 2:
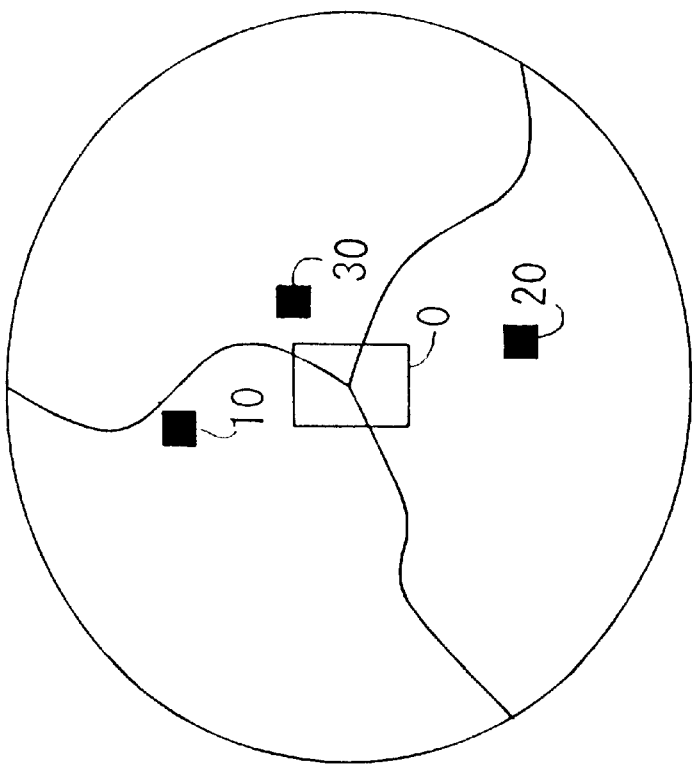
FIG. 2(A) is a diagram which shows a network coverage area divided into a plurality of regions at a first stage.
FIG. 2(B) is a diagram which shows the network coverage area further divided into a plurality of smaller regions at a second stage.
Figure 2:
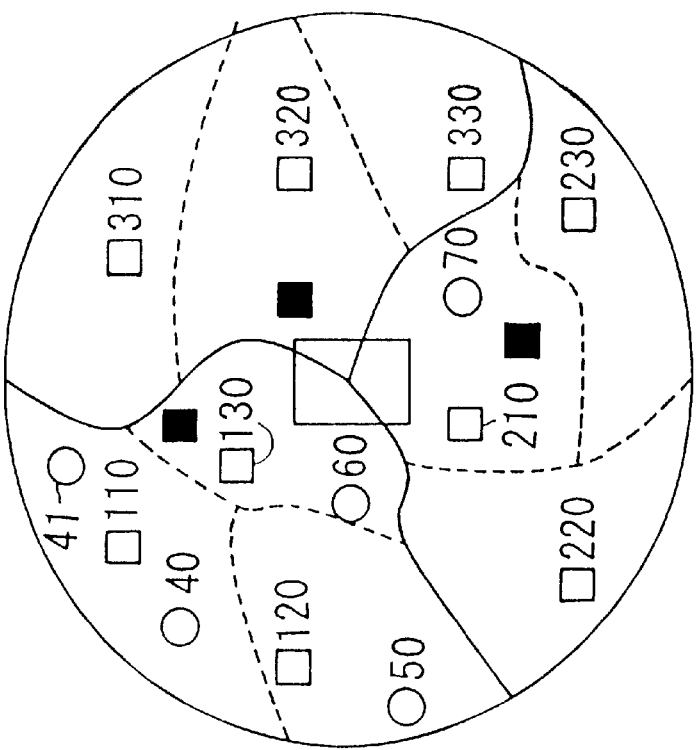

As a background knowledge, the following few paragraphs present a brief description of hash functions used in the present embodiment, assuming the area division illustrated in FIG. 2. Generally, hash function is a transformation that takes a variable-size input (a search keyword in the present case) and returns a fixed-size string, which is called the hash value. In the present invention, the data management servers use two kinds of hash functions called "primary hash function" and "secondary hash function." It is noted here that all primary servers commonly use the same primary hash function, while each primary server and its subordinate secondary servers (i.e., secondary servers in that server's primary area) share a common same secondary hash function of their own. In other words, the primary and secondary servers in different primary areas use different secondary hash functions.

The primary hash function, commonly used by the primary servers, produces the primary hash value by processing a given search keyword in the following way, based on the number of primary areas (="3") and the number of secondary areas (="3"). First, the given search keyword, now being treated as a binary value, is divided by "3." A constant value of "1" is then added to the remainder of that division, thus obtaining the primary hash value. The secondary hash function commonly used in the primary area of the primary server 10 divides a given search keyword by 2 (i.e., applying a 1-bit right-shift operation to the binary dividend) and further divides the quotient by 3. Lastly, a constant value of 1 is added to the remainder of the second division, thereby yielding the secondary hash value. The secondary hash function commonly used in the primary server 20's primary area divides a given search keyword by "4" (i.e., applying a 2-bit right-shift operation to the binary dividend) and further divides the quotient by 3. Then, a constant value of 1 is added to the remainder of the second division, thereby yielding the secondary hash value. Likewise, the secondary hash function commonly used in the primary server 30's primary area first divides a given search keyword by "8" (i.e., applying a 3-bit right-shift operation to the binary dividend), further divides the quotient by "3," and adds a constant value of "1" to the remainder of the second division, thereby yielding the secondary hash value.

(A) Primary Server Activation Process

This process allows primary servers to start operations as active ATM-ARP servers in the network. For an illustrative purpose, it is assumed here that the system supervisory server 0 has already activated the primary servers 10 and 20 by sequentially processing the activation requests sent from them, and has confirmed their activation. The system supervisory server 0 employs a counter that represents how many primary servers have been activated. This "primary server activation counter," or "primary counter" for short, now indicates a value of "2" since the primary servers 10 and 20 are serving.

(A-1) The system administrator enters an activation command to the primary server 30. This command triggers the activation request unit in the primary server 30 to execute the sequence shown in FIG. 28(B), thus activating the communication controller to transmit an activation request message to the system supervisory server 0.

(A-2) The communication controller 03 in the system supervisory server 0 receives and identifies this activation request message (FIG. 24). Since the received message belongs to the server activation message class, the process is handed over to the activation verification unit 00, which executes a process shown in FIG. 25. The activation verification unit 00 increments the primary server activation counter by one (FIG. 17). It then assigns the resultant counter value of "3" to the primary server 30 as its primary server identifier. The system supervisory server 0 activates its communication controller to supply the primary server 30 with an activation response message to inform of the identifier assigned thereto and primary server information messages which contain information about the primary servers 10 and 20 that have been activated already. The contents of the latter message are referred to as the "primary server information," which describes the network address and identifier of each working primary server. In addition, the system supervisory server 0 activates its communication controller 03 again to transmit a primary server information message to the primary server 10 and the primary server 20, which message conveys the primary server information (i.e., network address and primary server identifier) concerning the primary server 30 that has just been activated.

(A-3) In the primary servers 10 and 20, their respective server management units extract necessary information from the received primary server information message, and stores it into their server information storage (FIG. 32). In the primary server 30, on the other hand, its server management unit receives the activation response message and primary server information messages from the system supervisory server 0, and stores necessary information extracted from these messages into its server information storage (FIG. 32).

The primary server activation process described above develops a table of primary server information in each primary server, as well as in the system supervisory server 0. FIGS. 46(A) and 46(B) illustrate the contents of such server information storage in the system supervisory server 0, and that in the primary server 30, after all primary servers 10, 20, and 30 has become active.

(B) Secondary Server Activation Process

This process allows secondary servers to start operations as active ATM-ARP servers in the network. For illustration, it is assumed here that the primary server 10 has already activated the secondary servers 110, 120, and 130 by sequentially processing the activation requests sent from them, and. has confirmed their activation. Likewise, it is assumed that the primary server 20 has activated the secondary servers 210, 220, and 230, and that the primary server 30 has activated the secondary servers 310 and 320 in the same manner. Further, it is noted that each primary server has a counter that represents how many secondary servers have been activated (FIG. 18). This counter is referred to as a "secondary server activation counter," or "secondary counter" for short.

(B-1) The system administrator enters an activation command to the secondary server 330. In response to this command, the secondary server 330 makes its activation request unit execute the sequence of FIG. 37 (B) , thus activating the communication controller to transmit an activation request message to the primary server 30.

(B-2) The communication controller in the primary server 30 receives and identifies this activation request message (FIG. 29). Since it is a message that belongs to the server activation message class, the process is handed over to the activation verification unit (FIG. 30). The activation verification unit in the primary server 30 increments a relevant secondary server activation counter by one. It then assigns the resultant counter value of "3" to the secondary server 330 as its secondary server identifier. The primary server 30 activates its communication controller to supply the secondary server 330 with an activation response message which includes the identifier assigned thereto, as well as a plurality of secondary server information messages which convey the information about the secondary servers 310 and 320 that have been already activated. The contents of the latter message are referred to as the "secondary server information," which describes the network address and identifier of each working secondary server. Further, the primary server 30 activates its communication controller to send another secondary server information message to the other secondary servers 310 and 320 in the same primary area, as well as to the system supervisory server 0. This message notifies them of the network address and secondary server identifier of the secondary server 330 which has newly joined the present data management system.

(B-3) The server management unit in the system supervisory server 0 and those in the secondary servers 310 and 320 receive the secondary server information message concerning the secondary server 330, and stores necessary information extracted from the message into their own server information storage (FIGS. 27 and 39). The server management unit in the secondary server 330 also extracts necessary information from the received activation response message and secondary server information messages, and stores the extracted information into its own server information storage (FIG. 39).

The above-described secondary server activation process allows relevant secondary server information to be distributed and stored in all primary servers, secondary servers, and system supervisory server. FIGS. 47(A), 47(B), and 47(C) illustrate the contents of the server information storage in the system supervisory server 0, primary server 30, and secondary server 330, respectively, while assuming that the activation of all secondary servers has been completed.

(C) Data Registration Process

This process allows terminals to register data to the data management servers. For illustration, it is assumed here that all secondary servers in the system have just been started up and no registered records are available in their data storage. It is also supposed that the terminal 40, located in the secondary area of the secondary server 110, is now attempting to register a piece of network address information, "IP ADDRESS=5" and "ATM ADDRESS=55."

(C-1) Based on its internal or external command script, the terminal 40 executes a process shown in FIG. 21 to send a data registration request message (see FIG. 14) to the secondary server 110 through its communication controller. Here, the data registration request message contains registration data of "IP ADDRESS=5" and "ATM ADDRESS=55."

(C-2) Upon arrival of this data registration request message at its communication controller, the secondary server 110 performs a process of FIG. 40 by activating its data registration unit that is responsible for the data registration message class. With the received message recognized as a data registration request message, the data registration unit selects a process flow of F403, where the secondary server 110 applies its secondary hash function to the search key record, or the IP address "5" extracted from the message. More specifically, it shifts the binary number "101" (IP address "5") by one bit to the right direction, divides the result by "3," and adds "1" to the remainder. This calculation yields a secondary hash value of "3," which is used as a secondary server identifier. The data registration unit then increments the regular data counter by one, and stores the registration data, together with the secondary server identifier "3" obtained through the above hash calculation, to a specific data field of the regular data storage as pointed by the regular data counter. Here, the registration data actually contains an IP address to serve as a search keyword and an ATM address to be searched for.

The secondary server 110 then compares the above second hash value "3" with its own second server identifier "1" to determine whether the hash value indicates itself or not. Because they do not match, the data registration unit assembles a local replicated data registration request message on the basis of the data registration request message in process. This message, having a value of "1" in its requester's second server identifier field, is transmitted by the communication controller toward the secondary server 130 whose secondary server identifier is known to be "3." The data registration unit further creates another data registration request message having a value of "1" in its requester's second server identifier field (see FIG. 13) and transmits it to the primary server 10 by activating the communication controller.

(C-3) The secondary server 130 receives the local replicated data registration request message through its communication controller, and starts a process shown in FIG. 40 by activating its data registration unit. Since the received message is identified as a local replicated data registration request message, it takes a process flow of F404, whose main part is shown in FIG. 41. According to this F404, the data registration unit increments the local replicated data counter by one and stores the registration data, together with the requester's secondary server identifier "1," to the local replicated data storage as pointed by the counter.

(C-4) The primary server 10 receives the data registration request message through its communication controller, and executes a process shown in FIG. 33 by activating its data registration unit to handles the data registration message class. On identifying the received message as a data registration request message, the data registration unit selects a process flow of F333, where the aforementioned primary hash function is applied to the given IP address "5" extracted from the message as a search keyword. More specifically, it divides the IP address value of "5" by "3," and adds "1" to the remainder, thus yielding a primary hash value of "3." This hash value is then compared with the primary server 10's identifier "1." Because they do not agree with each other, the data registration unit produces a replicated data registration request message on the basis of the data registration request message in process. This message, containing a value of "1" in its requester's primary server identifier field, is transmitted by the communication controller to the primary server 30 whose primary server identifier is known as "3."

(C-5) The primary server 30 receives the replicated data registration request message through its communication controller, and executes a process shown in FIG. 33 by activating its own data registration unit that is responsible for the data registration message class. Since the received message is a replicated data registration request message, the data registration unit takes a process flow of F334, where the primary server 30's secondary hash function is applied to the IP address "5" extracted from the message as a search key record. More specifically, it right-shifts the binary number "101" (IP address "5") by three bits, divides the result by "3," and adds "1" to the remainder. This calculation yields a secondary hash value of "1," which is used as a secondary server identifier. The data registration unit then increments the remote backup data counter by one and stores the registration data and the obtained secondary server identifier "1" to the remote backup data storage as pointed by the remote backup data counter. Further, the primary server 30 assembles a remote replicated data registration request message based on the received replicated data registration request message, and activates its local communication controller to send the message to the secondary server 310 whose secondary server identifier is known to be "1."

(C-6) The secondary server 310 receives this request message through its communication controller, and starts a process shown in FIG. 40 by activating its local data registration unit that is responsible for the data registration message class. Since the received message is identified as a remote replicated data registration request message, the data registration unit selects a process flow of F405, whose main part is shown in FIG. 41. In F405, the data registration unit increments the remote replicated data counter by one, and stores the registration data and its own secondary server identifier "1" to the remote replicated data storage as pointed by the remote replicated data counter.

Now, the next two paragraphs present another example of data registration process. It is assumed here that the terminal 60 is uploading a piece of network address information, "IP ADDRESS=4" and "ATM ADDRESS=54" to the secondary server 130 for data registration. Upon receipt of a data registration request message, the secondary server 130 obtains a secondary hash value of "3" from the IP address value "4" contained in the message. It then saves the registration data into its regular data storage, along with the above secondary hash value "3." Since this hash value agrees with its own identifier, the secondary server 130 further stores the same data into its local replicated data storage (F403 in FIG. 40).

After that, the secondary server 130 activates its communication controller to send an extra data registration request to the primary server 10. This extra step allows another replica of the registration data to be entered into the local backup data storage in the primary server 10 (F331 in FIG. 33). The subsequent hash calculation in the primary server 10 leads to a primary hash value of "2," which causes the transmission of another replicated data registration request message to the primary server 20. This replicated data registration request message delivers the original registration data (i.e., "IP ADDRESS=4" and "ATM ADDRESS=54") to the remote backup data storage in the primary server 20, as well as causing a remote replicated data registration request message to the secondary server 220 (F334 in FIG. 33). More specifically, the data registration unit in the primary server 20 shifts the binary number "100" (IP address "4") by two bits to the right direction, divides the result by "3," and adds "1" to the remainder. This calculation yields a secondary hash value of "2" indicative of a specific secondary server 220 in the same primary area. Accordingly, the primary server 20 sends a remote replicated data registration request message, so that the secondary server 220 will save the registration data into its remote replicated data storage.

The following paragraphs presents still another example of the data registration process. Suppose that the terminal 50 is attempting to register a piece of address information, "IP ADDRESS=12" and "ATM ADDRESS=62," to the secondary server 120. The secondary server 120 saves the registration data into its regular data storage. The IP address value "12" derives a secondary hash value of "1" in this case, thus causing the registration data to be transferred to the secondary server 110 for registration in its local replicated data storage. The IP address value "12" also leads to a primary hash value of "1" in this context, which causes the registration data to be transferred to the primary server 10 within the same primary area for registration in its remote backup data storage. This data registration triggers another message transmission to the secondary server 110 so that the same registration data will be stored in its remote replicated data storage.

The above explanation has exemplified three data registration requests and their processes. FIGS. 48(A) to 48(E) and 49(A) to 49(C) totally show the resultant data contents in the primary and secondary servers' local data storage. Here, the secondary servers 210, 230, 320, and 330 are not included, because no data registration has happened to their local data storage in the above-described three processes.

More specifically, FIG. 48(A) shows the contents of the local backup data storage and remote backup data storage in the primary server 10. FIG. 48(B) shows the contents of the local backup data storage and remote backup data storage in the primary server 20. FIG. 48(C) shows the contents of the local backup data storage and remote backup data storage in the primary server 30. FIG. 48(D) shows the contents of the regular data storage, local replicated data storage, and remote replicated data storage in the secondary server 110. FIG. 48(E) shows the contents of the regular data storage, local replicated data storage, and remote replicated data storage in the secondary server 120.

FIG. 49(A) shows the contents of the regular data storage, local replicated data storage, and remote replicated data storage in the secondary server 130. FIG. 49(B) shows the contents of the regular data storage, local replicated data storage, and remote replicated data storage in the secondary server 220. FIG. 49(C) shows the contents of the regular data storage, local replicated data storage, and remote replicated data storage in the secondary server 310.

(D) Data Retrieval Process

This process allows terminals to make access to the registration data in the ATM-ARP servers. Since the actual process flow may vary, depending on the locations of original sources of address information, the following explanation is divided into four parts, Cases (1) to (4). All those cases assumes that the data contents shown in FIGS. 48(A) to 48(E) and 49(A) to 49(C) have been developed in those servers through the data registration processes described in section (C).

CASE (1)

CASE (1) describes such a situation that the information that a terminal is looking for is what was originally registered by another terminal located in the same secondary area. Suppose, for example, that a terminal 41 is now trying to communicate with another terminal 40 having an IP address "5" without knowing its ATM address.

(D-1-1) Due to the lack of knowledge about the destination ATM address, the terminal 41 executes a data retrieval process of FIG. 22. That is, the data retrieval request unit creates a data retrieval request message with a search keyword value of "5" and activates the communication controller to send the message to the secondary server 110.

(D-1-2) The secondary server 110 receives this request message through its communication controller, and executes a process of FIG. 42 by activating its data retrieval unit that is responsible for the data retrieval message class. Since the received message is identified as a data retrieval request message, the data retrieval unit takes a process flow of F423, whose main part is shown in FIG. 43. In F423, the data retrieval unit extracts a search keyword "5" from the request message, saves this search keyword and the connection identifier for the terminal 41 for later use, and then searches the regular data storage for a record relevant to the extracted search keyword "5." In CASE (1), this search successfully ends up with a record containing "IP ADDRESS=5" (search keyword) and "ATM ADDRESS=55" (retrieved data). Then, according to the flowchart of FIG. 45, the search report unit produces a "data found" message with the format of FIG. 16 to inform the requesting terminal 41 of the successful search result. It obtains the connection to the terminal 41 from the search keyword "5" and transmits the "data found" message to the requesting terminal 41 by activating the communication controller.

CASE (2)

CASE (2) describes such a situation that the information that a terminal is looking for is what was originally registered by another terminal located in another secondary area as part of the same primary area. Suppose, for example, that a terminal 50 is trying to communicate with another terminal 40 having an IP address "5" without knowing its ATM address.

(D-2-1) Due to the lack of knowledge about the destination ATM address, the terminal 50 executes a data retrieval process according to the flowchart of FIG. 22. That is, the data retrieval request unit in the terminal 50 creates a data retrieval request message with a search keyword of "5" and activates the communication controller to send the message to the secondary server 120.

(D-2-2) The secondary server 120 receives this data retrieval request message through its communication controller, and initiates a process of FIG. 42 by activating its data retrieval unit that deals with the data retrieval message class. Since the received message is identified as a data retrieval request message, the data retrieval unit takes a process flow of F423, whose main part is shown in FIG. 43. In F423, the data retrieval unit first extracts a search keyword "5" from the request message, saves this search keyword and the connection identifier for the terminal 50 for later use, and then searches its own regular data storage for a record relevant to the extracted search keyword "5." In this CASE (2), however, this search ends up with no matches. The data retrieval unit then applies its secondary hash function to the search keyword "5," thus obtaining a secondary hash value of "3." Since this secondary hash value "3" does not match with its own secondary server identifier "2," the secondary server 120 produces a local replicated data retrieval request message (FIG. 13) on the basis of the data retrieval request message in process. This new message, having a value of "2" in its secondary server identifier field, is transmitted by the communication controller to another secondary server 130 whose secondary server identifier is known to be "3."

(D-2-3) The secondary server 130 receives this message through its communication controller, and executes a process shown in FIG. 42 by activating its data retrieval unit that is responsible for the data retrieval message class. Since the received message is identified as a local replicated data retrieval request message, the data retrieval unit in the secondary server 130 takes a process flow of F424, whose main part is shown in FIG. 43. In F424, the data retrieval unit extracts a search keyword "5" from the request message, and searches its local replicated data storage to find a record relevant to the extracted search keyword "5." Since this search successfully ends up with a record containing "IP ADDRESS=5" (search keyword) and "ATM ADDRESS= 55" (retrieved data), the data retrieval unit produces a "data found" message that contains the detailed search results. This "data found" message is transmitted by the communication controller to the secondary server 120, which is identified as the requesting server by the secondary server identifier "2" found in the received message.

(D-2-4) The secondary server 120 receives this message through its communication controller, and executes a process shown in FIG. 45 by activating its search report unit that is responsible for the search report message class. The search report unit converts the received message to the format used for returning search results from servers to terminals (FIG. 16). It obtains a network connection to reach the requesting terminal 50 by using the search keyword "5" and then activates the communication controller to transmit the converted "data found" message to the requesting terminal 50.

CASE (3)

CASE (3) describes such a situation that the information that a terminal is looking for is what was originally registered by another terminal located in a different primary area. Suppose, for example, that a terminal 70 is trying to communicate with another terminal 40 having an IP address "5" without knowing its ATM address.

(D-3-1) Due to the lack of knowledge about the destination ATM address, the terminal 70 executes a data retrieval process according to the flowchart of FIG. 22. That is, the data retrieval request unit in the terminal 70 produces a data retrieval request message with a search keyword of "5" and activates its communication controller to send the message to the secondary server 230.

(D-3-2) The secondary server 230 receives this message through its communication controller, and initiates a process of FIG. 42 by activating its data retrieval unit that is generally responsible for the data retrieval message class. Since the received message is identified as a data retrieval request message, the data retrieval unit takes a process flow of F423, whose main part is shown in FIG. 43. In F423, the data retrieval unit extracts a search keyword "5" from the request message, saves the extracted search keyword and the connection identifier for the terminal 70, and then searches the regular data storage for a record relevant to the search keyword "5." In CASE (3), however, this search ends up with no matches. The data retrieval unit then applies its secondary hash function to the search keyword "5," thus obtaining a secondary hash value of "2." Since this secondary hash value "2" does not coincide with its own secondary server identifier "3," the secondary server 230 produces a local replicated data retrieval request message (FIG. 13) on the basis of the data retrieval request message in process. This new message, containing the secondary server 230's identifier "3" in its second server identifier field, is transmitted by the communication controller to another secondary server 220 whose secondary server identifier is known to be "2."

(D-3-3) The secondary server 220 receives this message through its communication controller, and executes a process shown in FIG. 42 by activating its data retrieval unit that is responsible for the data retrieval message class. Since the received message is identified as a local replicated data retrieval request message, the data retrieval unit in the secondary server 220 takes a process flow of F424, whose main part is shown in FIG. 43. In F424, the data retrieval unit extracts a search keyword "5" from the request message, and searches the local replicated data storage for a record relevant to the extracted search keyword "5." Since this search gains no matches, the data retrieval unit produces a data retrieval request message, instead of creating a "data not found" message. The communication controller then transmits this request message to the primary server 20 in the same primary area.

(D-3-4) The primary server 20 receives this message through its communication controller, and initiates a process shown in FIG. 34 by activating its data retrieval unit that is responsible for the data retrieval message class. Since the received message is identified as a data retrieval request message, the data retrieval unit selects a process flow of F342, where the primary hash function is applied to the given IP address "5" extracted from the message as a search keyword, thereby obtaining a primary hash value of "3." Because this resultant hash value "3" does not agree with its own primary server identifier "2," the activation request unit in the primary server 20 produces a replicated data retrieval request message on the basis of the data retrieval request message in process. This new message, having the primary server 20's identifier "2" in its primary server identifier field, is transmitted by the communication controller to the primary server 30 whose primary server identifier is known to be "3."

(D-3-5) The primary server 30 receives this message through its communication controller, and executes a process shown in FIG. 34 by activating its data retrieval unit that is responsive to the data retrieval message class. Since the received message is identified as a replicated data retrieval request message, the data retrieval unit in the primary server 30 takes a process flow of F343, where the data retrieval unit assembles a remote replicated data retrieval request message based on the received message. The destination of this new message is obtained by applying the secondary hash function to the given IP address "5" received as a search keyword. With the resultant secondary hash value of "1," the data retrieval unit activates the communication controller to send the message to the secondary server 310 whose identifier is known to be "1."

(D-3-6) The secondary server 310 receives this message through its communication controller, and executes a process shown in FIG. 42 by activating its data retrieval unit that deals with the data retrieval message class. Since the received message is identified as a remote replicated data retrieval request message, the data retrieval unit in the secondary server 310 takes a process flow of F425, whose main part is shown in FIG. 44. In F425, the data retrieval unit searches the remote replicated data storage for a record relevant to a specific search keyword "5" extracted from the request message. This search successfully ends up with the exact match. Because the remote replicated data retrieval request message has a non-zero value in its primary server identifier field, the data retrieval unit activates the communication controller to send a "data found" message to the primary server 30. The "data found" message contains a value of "5" in its search keyword field and a value of "55" in its retrieved data field. It further conveys a primary server identifier field value "2" and a secondary server identifier field value "3" copied from the remote replicated data retrieval request message.

(D-3-7) The primary server 30 receives this message through its communication controller, and executes a process of FIG. 36 by activating its search report transfer unit that is responsible for the search report message class. Since the primary server identifier field value "2" in the message does not match with its own primary server identifier "3," the search report transfer unit searches its server information storage for a primary server having an identifier "2." The search report transfer unit reaches the primary server 20, and thus the "data found" message is forwarded to the primary server 20 via the communication controller.

(D-3-8) The primary server 20 receives this message through its communication controller, and executes a process shown in FIG. 36. Since the primary server identifier field value "2" in the received message coincides with its own primary server identifier, the primary server 20 searches the server information storage to find a secondary server corresponding to the secondary server identifier "3" found in the received message. This search finds the secondary server 230, and the "data found" message is transferred to the secondary server 230 via the communication controller.

(D-3-9) Upon receipt of this "data found" message through its communication controller, the secondary server 230 activates its search report unit to execute a process of FIG. 45. Here, the search report unit converts the message to another format suitable for server-to-terminal communication (FIG. 16), and retrieves the connection identifier for the terminal 70 by using the search keyword "5." Finally, the converted "data found" message is transmitted to the terminal 70 via the communication controller.

CASE (4)

CASE (4) describes a situation where the information that a terminal is looking for is not available in any secondary servers. Suppose, for example, that a terminal 80 has sent a data retrieval request message to seek an ATM address corresponding to an IP address "22." This request invokes the same processes as described in steps (D-3-1) to (D-3-5).

In step (D-3-6), the secondary server 230 searches its remote replicated data storage for a record relevant to the given search keyword "22," but it fails to find such a record. According to the flowchart of FIG. 44, the secondary server 230 transmits a "data not found" message to the primary server 20 through the communication controller. Note that this message contains a value of "22" in its search keyword field, as well as carrying a primary server identifier field value "3" and a secondary server identifier field value "3" that are copied from the remote replicated data retrieval request message. This unsuccessful search report is treated similarly to step (D-3-7), and the requesting terminal 80 finally receives this "data not found" message.

(E) Data Restoration Process

This process allows the system to recover from failure in a server by replacing it with a backup server and recollecting necessary information from other servers. The following two sections (E-1) and (E-2) describe this data restoration process by way of example.

(E-1) Primary Server Restoration

For backup purposes, the ATM network employs a server 11 with a network address "110" which has functionality as a primary server. PVCs are pre-established from this backup server 11 to the primary servers 20 and 30 and the secondary servers 110, 120, and 130. Suppose here that the primary server 10 has lost its records due to some failure. The system administrator then decides to make the backup server 11 take the place of the failed primary server 10 by executing the following process.

(E-1-1) The system administrator enters a reactivation command to the backup server 11 by specifying a network address "100" that represents the failed primary server 10. This command invokes a process shown in FIG. 28(C), where the reactivation request unit in the new primary server 11 produces a reactivation request message (FIG. 9) containing a value of "100" in its "obsolete server's network address" field and a value of "110" in its "requester's network address" field. The reactivation request unit then triggers the communication controller to send this message to the system supervisory server 0.

(E-1-2) The system supervisory server 0 receives this message through its communication controller, and executes a process of FIG. 25 by triggering its activation verification unit, which is responsible for the server activation message class. Since the received message is identified as a reactivation request message, the process branches off to the flowchart of FIG. 26, where the activation verification unit first extracts a network address value "100" from the field titled "obsolete server's network address" as part of the reactivation request message. It then searches the server information storage in the system supervisory server 0 to find a record corresponding to the extracted network address value "100," thereby yielding a primary server identifier "1" which indicates the failed primary server 10.

Via the communication controller, the activation verification unit supplies the requesting primary server 11 with several messages including: a reactivation response message, primary server restoration messages, and secondary server restoration messages. The reactivation response message (FIG. 10) contains two parameters: a primary server identifier "1" that is to be reassigned to the new primary server 11, and the number of primary and secondary server restoration messages that will be delivered to the requesting primary server 11. More specifically, the latter parameter is calculated by subtracting "1" from the current value "3" of the primary server activation counter and then adding thereto the secondary server activation counter value "3" that represents the number of secondary servers formerly under the control of the primary server 10. Therefore, in the present case, this parameter has a value of "5."

The activation verification unit further activates the communication controller to transmit a primary server substitution message to the primary servers 20 and 30 and the secondary servers 110, 120, and 130, which are involved in the present restoration process. This message informs those servers of the network address and primary server identifier of the new primary server 11 that is now requesting the data restoration.

(E-1-3) The requesting primary server 11 receives the reactivation response message as well as the primary and secondary server restoration messages. The other primary servers 20 and 30 and the secondary servers 110, 120, and 130, being involved in the present data restoration process, receive the primary server substitution message. All those servers activate their own server management units to store the necessary parameters into their local server information storage or update the contents according to the flowcharts of FIGS. 32 and 39.

Upon receipt of as many primary and secondary server restoration messages as announced in the restoration response message, the requesting primary server 11 activates its communication controller to send an extra data restoration request message to all of its subordinate second servers 110, 120, and 130.

(E-1-4) The secondary servers 110, 120, and 130 receive this extra data restoration request message through its communication controller, and initiates a process shown in FIG. 42 by activating its data retrieval unit that is responsive to the data retrieval message class. Since the received message is identified as an extra data restoration request message, the data retrieval unit takes a process flow F422 to search the regular data storage to find a specific record whose server identifier field value matches with the present secondary server's identifier. If such a record is found, the data retrieval unit creates an extra data restoration message containing that registration data and its own secondary server identifier, and activates the communication controller to send the message to the requesting primary server 11. In the present context, only one such record is found in the secondary server 130 (FIG. 49(A)), whose contents are "IP ADDRESS=4," "ATM ADDRESS=54," and "SERVER IDENTIFIER=3."

Subsequently, those secondary servers 110, 120, and 130 scan their respective remote replicated data storage to retrieve all the records stored therein. The retrieved records are separately packaged into a plurality of remote backup data restoration messages and transmitted to the primary server 11 through the communication controllers. Here, each message contains a retrieved record and the present secondary server's identifier. In the present context, only one such record is found in the secondary server 110 (FIG. 48(D)), which reads "IP ADDRESS=12," "ATM ADDRESS=62," and "SERVER IDENTIFIER=1."

(E-1-5) The primary server 11 receives an extra data restoration message or remote backup data restoration messages through its communication controller, and executes a process of FIG. 33 by activating its data registration unit, which is responsible for the data registration message class. When the received message is an extra data restoration message, the data registration unit selects a process flow F331. Here, it first increments the local backup data counter by one, and then saves the received registration data (i.e., "IP ADDRESS=4" and "ATM ADDRESS=54") and the secondary server identifier "3" into the local backup data storage as pointed by the incremented counter. When, in turn, the received message is a remote backup data restoration message, the data registration unit selects a process flow F332, where it first increments the remote backup data counter by one. Then the data registration unit saves the received registration data (i.e., "IP ADDRESS=12" and "ATM ADDRESS=62") and the secondary server identifier "1" into the remote backup data storage as pointed by the counter. a result, the new primary server 11 has restored the same records as those held in the failed primary server 10, s shown in FIG. 48(A).

(E-2) Secondary Server Restoration

The ATM network employs another server 131 for backup purposes, which has functionalities equivalent to he secondary server 130, but is assigned a different network address "1310." There are pre-established PVCs that allow this backup server 131 to interact with the primary server 10 (or substitutive primary server 11, if failure happened) and/or the secondary servers 110 and 120. Suppose here that the secondary server 130 has lost its records due to some trouble. The system administrator then attempts to make the backup server 131 take the place of the failed secondary server 130 by executing the following steps.

(E-2-1) The system administrator enters a reactivation command to the substitutive secondary server 131 by specifying a network address "1300" that represents the failed secondary server 130. This command invokes a process shown in FIG. 37(C), in which the reactivation request unit in the new secondary server 131 produces a reactivation request message (FIG. 9) containing a value of "1300" in its "obsolete server's network address" field and a value of "1310" in its "requester's network address" field. The reactivation request unit then activates the communication controller to send this message to the primary server 10.

(E-2-2) The primary server 10 receives this reactivation request message through its communication controller, and executes a process shown in FIG. 30 by triggering its activation verification unit, which is responsible for the server activation message class. Since the received message is identified as a reactivation request message, the present process branches off to the flowchart of FIG. 31, where the activation verification unit first extracts a network address value "1300" from the "obsolete server's network address" field of the message. It then searches its local server information storage to find a record corresponding to the extracted network address value "1300," thereby yielding a secondary server identifier "3" which indicates the failed secondary server 130. Via the communication controller, the activation verification unit sends a reactivation response message and secondary server restoration messages to the secondary server 131, which is the origin of the present reactivation request. The reactivation response message (FIG. 10) actually contains the following two parameters: a secondary server identifier "3," which originally was the identifier of the failed secondary server 130 and now will be reassigned to the substitutive secondary server 131, and the number of secondary server restoration messages that will be sent to the secondary server 131 later on. In the present case, the secondary server activation counter value "3" subtracted by "1" gives the latter parameter value of "2."

The activation verification unit further sends a secondary server substitution message via the communication controller to the system supervisory server 0 and the secondary servers 110 and 120, which are involved in the present restoration process. This secondary server substitution message contains the network address value "1310" of the requesting secondary server 131 and its secondary server identifier "3."

(E-2-3) The secondary server 131 receives the reactivation response message and secondary server restoration messages. On the other hand, the system supervisory server 0 and secondary servers 110 and 120, being involved in the present restoration process, receive the secondary server substitution message. All those servers activate their respective server management units to store the necessary parameters into their local server information storage or update their contents according to the flowcharts of FIGS. 27 and 39.

Upon receipt of as many secondary server restoration messages as announced in the restoration response message, the secondary server 131 assembles a data restoration request message with its own identifier "3" and transmits the message via the communication controller to the primary server 10, as well as to the other secondary servers 110 and 120 located in the same primary area.

(E-2-4) The primary server 10 receives this data restoration request message through its communication controller, and executes a process shown in FIG. 34 by activating its data retrieval unit, which is responsible for the data retrieval message class. Since the received message is a data restoration request message, the process is further continued to FIG. 35. In F341, the data retrieval unit first searches the local backup data storage to find a particular record whose server identifier value matches with the secondary server identifier "3" extracted from the received data restoration request message. If such a record is found, the data retrieval unit creates an extra data restoration message containing the registration data and activates the communication controller to send it to the requesting secondary server 131. In the present context, only one such record is found in the primary server 10, whose contents are "IP ADDRESS=4," "ATM ADDRESS=54," and "SERVER IDENTIFIER=3" as shown in FIG. 48(A).

Next, the data retrieval unit searches the remote backup data storage to find a record whose server identifier value matches with the secondary server identifier "3" extracted from the received data restoration request message. If such a record is found, the data retrieval unit assembles a remote replicated data restoration message containing the retrieved record, and activates the communication controller to send it to the secondary server 131. In the present context, however, there is no such records in the primary server 10's storage.

(E-2-5) The secondary servers 110 and 120 receive the data restoration request message through their respective communication controllers, and execute a process shown in FIG. 42 by activating their data retrieval units that are responsible for the data retrieval message class. Upon discriminating the type of the received message, each data retrieval unit takes a process flow F421 to search the regular data storage for a specific record whose server identifier field value matches with the requesting server's identifier "3" extracted from the message. If such a record is found, the data retrieval unit creates a local replicated data restoration message containing that registration data and its own secondary server identifier, and activates the communication controller to send the message to the requesting secondary server 131. In the present context, only one such record is found in the secondary server 110, whose contents are "IP ADDRESS=5," "ATM ADDRESS=55," and "SERVER IDENTIFIER=3" as FIG. 48(D) shows.

Subsequently, the data retrieval unit searches the local replicated data storage to find a particular record whose server identifier field value matches with the secondary server identifier "3" extracted from the received data restoration request message. If such a record is found, the data retrieval unit produces a regular data restoration message containing the found registration data and the present secondary server's identifier. This message is transmitted via the communication controller to the secondary server 131. In the present example, however, there is no such records in their storage.

(E-2-6) The secondary server 131 receives the extra data restoration message, remote replicated data restoration message, local replicated data restoration message, or regular data restoration message through its communication controller. It then initiates a process shown in FIG. 40 by activating its data registration unit, which is responsible for the data registration message class.

When the received message is an extra data restoration message, the data registration unit selects a process flow F402, where it first increments the regular data counter and then saves the received registration data ("IP ADDRESS=4" and "ATM ADDRESS=54") and its own secondary server identifier "3" into the regular data storage as pointed by the counter. The data registration unit also increments the local replicated data counter by one, and stores the same registration data into the local backup data storage as pointed by the counter.

When the received message is a remote replicated data restoration message, the data registration unit selects a process flow F401, where it first increments the remote replicated data counter by one, and then saves the received registration data and its own secondary server identifier "3" into the remote replicated data storage as pointed by the counter. In the present example, however, this process F401 is not executed because the secondary server 131 receives no remote replicated data restoration messages.

When the received message is a local replicated data restoration message, the data registration unit selects a process flow F401, where it first increments the local replicated data counter and then saves the received registration data ("IP ADDRESS=5" and "ATM ADDRESS=55") and the secondary server identifier extracted from the received message into the local replicated data storage as pointed by the counter.

When the received message is a regular data restoration message, the data registration unit selects a process flow F401, where it first increments the regular data counter by one, and then saves the received registration data and the secondary server identifier extracted from the message into the regular data storage as pointed by the counter. In the present context, however, this process will not happen because the secondary server 131 receives no regular data restoration messages.

Through the process (E-1) or (E-2) described above, the data management system can recover from failure of a primary or secondary server. Since a plurality of servers store the records in a distributed manner, the backup server can recollect every necessary data from the primary area where the failed server is located.

The above discussion is summarized as follows. According to the present invention, the entire coverage area of a network is divided into a plurality of primary areas, and each primary area is subdivided into a plurality of secondary areas. Primary and secondary servers are deployed in the network, one for each individual primary area and secondary area, respectively. The primary servers employ a primary hash function that processes a given search keyword to derive a primary server identifier indicating one of the primary servers that governs a particular primary area where the secondary server having a record corresponding to the given search keyword is located. Further, the primary servers have a secondary hash function that processes a given search keyword to derive a specific secondary server identifier indicating one of the secondary servers that is located in the same primary area as their own and has a record corresponding to the given search keyword. The secondary servers are also equipped with the same secondary hash function as the primary servers'. Those two hash functions are used in both data registration and data retrieval processes.

The data registration process, initiated by a terminal, will produce multiple replicas of the registration data and save them in: (1) a secondary server that has accepted the data registration request from the terminal, (2) another secondary server located in the local primary area, and (3) still another secondary server located in a remote primary area. Tracing the logical hierarchy of servers, the data registration process proceeds in such three stages, thus allowing the registration data to be maintained on the network in a distributed manner.

As in the data registration process, data retrieval is accomplished by using the same hierarchical paths. That is, each data retrieval process starts at a secondary server that has accepted the original query from a terminal. If no match is found, then the secondary server finds another secondary server in the same primary area by applying its own secondary hash function and requests that secondary server to make a second search. Upon this request, the secondary server makes a search for the desired record. If it is still unable to find the record, the data retrieval request is transferred to still another secondary server that is identified in the network-wide scale by using the primary and secondary hash functions. This hierarchical network search will enable the desired record to be reached through at most three process stages without fail.

In the present invention, the registration data is saved into separate data storage areas disposed in the servers for dedicated use in each stage of the data registration process. This configuration makes it possible for the servers to quickly find the desired record, since the servers just have to scan a limited area of their data storage, depending on the stages of a data retrieval process.

In addition, the data management system of the present invention stores server identifiers, along with the registration data, into the above-described separate data storage facilities at each stage of a data registration process. Such server identifiers enable the records in a primary or secondary server to be promptly reconstructed from other servers, even if they are lost due to some troubles.

Moreover, the data management system of the present invention employs a system supervisory server to manage the servers on the network. The primary and secondary servers are designed to issue an activation request message to this server, when they start up. The resulting server activation process automatically builds a local database in the system supervisory server to hold the up-to-date configuration data concerning all servers on the network. Likewise, the primary servers acquire the configuration data of all primary servers on the network, as well as of all secondary servers in their respective primary areas, while every secondary server obtains the configuration data of all secondary servers in the same primary area.

In the present invention, the primary servers have a common primary hash function, and each primary server and its subordinate secondary servers in the same primary area share a common secondary hash function. This ensures that a record registered in a primary area can be retrieved at the first or second stage when requested from terminals within the same primary area, and at the third stage when requested from terminals in other primary areas.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A data management system for allowing terminals on a network to register records with search keywords and to retrieve the records by entering a specific search keyword, comprising:

a plurality of primary areas which constitute an entire coverage area of the network;

a plurality of secondary areas which constitute each of said primary areas;

a plurality of secondary servers, one for each secondary area, uniquely identified in each primary area by secondary server identifiers assigned thereto, which store records in a distributed manner to serve the terminals coupled thereto;

a plurality of primary servers, one for each primary area, uniquely identified in the network by primary server identifiers assigned thereto, which control storing and retrieving of the records to/from said plurality of secondary servers;

primary transformation means, disposed in each primary server, for processing a given search keyword to derive a specific primary server identifier indicating one of said primary servers that governs a particular primary area where the secondary server having a record corresponding to the given search keyword is located; and secondary transformation means, disposed in each primary server and each secondary server, for processing the given search keyword to derive a specific secondary server identifier indicating one of said secondary servers that is located in the same primary area and has a record corresponding to the given search keyword, wherein a record originated in one of said primary area and accepted by one of said secondary servers is registered in:

(a) said secondary server that has accepted the record, (b) a second secondary server that is identified by said secondary transformation means of said accepting secondary server, and (c) a third secondary server in a primary area other than said originating primary area and that is identified by said primary transformation means serving in said originating primary area.

2. The data management system according to claim 1, further comprising:

data registration request message transmission means, disposed in each terminal and activated when data registration is requested, for transmitting a data registration request message containing registration data to the secondary server in the secondary area where the requesting terminal is located, the retrieval data including a search keyword and a data object to be retrieved; and data registration request message transmission means, disposed in each terminal and activated when data retrieval is requested, for transmitting a data retrieval request message to the secondary server in the secondary area where the requesting terminal resides, the data retrieval request message containing a search keyword and an identifier of the requesting terminal.

3. The data management system according to claim 1, further comprising:

registration data storage means, disposed in each secondary server and activated when a data registration request message containing registration data is received from one of the terminals, for storing the registration data into regular data storage thereof, the registration data including a search keyword and a data object to be retrieved with the search keyword;

first registration requesting means, disposed in each secondary server and activated when the data registration request message containing the registration data is received, for subjecting the search keyword as part of the received registration data to said secondary transformation means, and if the resultant secondary server identifier differs from the secondary server identifier of its own, transmitting a local replicated data registration request message containing the registration data to one of said secondary servers that is identified in the same primary area by the resultant secondary server identifier; and second registration requesting means, disposed in each secondary server, for transmitting another data registration request message containing the same registration data to one of said primary servers that covers the primary area where said secondary server is located.

4. The data management system according to claim 3, further comprising storage means, disposed in each secondary server and activated when the local replicated data registration request message is received from said first registration requesting means, for storing the registration data into local replicated data storage thereof.

5. The data management system according to claim 3, further comprising:

third registration requesting means, disposed in each primary server and activated when the data registration request message is received from said second registration requesting means, for subjecting the search keyword as part of the received registration data to said primary transformation means, and transmitting still another data registration request message containing the same registration data to one of said primary servers that is identified by a primary server identifier obtained from said primary transformation means;

fourth registration requesting means, disposed in each primary server and activated when the data registration request message is received from said third registration requesting means, for subjecting the search keyword as part of the received registration data to said secondary transformation means, and transmitting a remote replicated data registration request message containing the same registration data to one of said secondary servers that is located in the same primary area and identified by a secondary server identifier obtained from said secondary transformation means; and storage means, disposed in each secondary server and activated when the remote replicated data registration request message is received from said fourth registration requesting means, for storing the registration data into remote replicated data storage thereof.

6. The data management system according to claim 1, further comprising:

reporting means, disposed in each secondary server and activated when a data retrieval request message containing at least a search keyword is received from one of the terminals, for searching regular data storage in said secondary server to find a record relevant to the search keyword, and if the record is found, sending the found record to the requesting terminal;

transformation activation means, disposed in each secondary server and activated when the data retrieval request message is received, for searching the regular data storage to find a record relevant to the search keyword, and if the record is not found, subjecting the search keyword to said secondary transformation means in said secondary server; and first data retrieval requesting means, disposed in each secondary server and activated when the secondary server identifier derived from said secondary transformation means differs from the secondary server identifier of its own, for transmitting a local replicated data registration request message containing at least the search keyword to one of said secondary servers that is located in the same primary area and identified by the obtained secondary server identifier.

7. The data management system according to claim 6, further comprising:

data retrieval means, disposed in each secondary server and activated when the local replicated data retrieval request message is received, for searching local replicated data storage in said secondary server to find a record relevant to the search keyword;

first successful search report sending means, disposed in each secondary server and activated when said data retrieval means has successfully found the record relevant to the search keyword, for sending a successful search report message containing the found record; and second data retrieval requesting means, disposed in each secondary server and activated when said data retrieval means has failed to find the record relevant to the search keyword, for sending another data retrieval request message containing at least the search keyword to one of said primary servers that covers the primary area where said secondary server is located.

8. The data management system according to claim 7, further comprising:

third data retrieval requesting means, disposed in each primary server and activated when the data retrieval request message is received from said second data retrieval requesting means, for subjecting the search keyword to said primary transformation means in the primary server, and transmitting still another data retrieval request message containing at least the search keyword to one of said primary servers that is identified by a primary server identifier obtained by said primary transformation means; and fourth data retrieval requesting means, disposed in each primary server and activated when the data retrieval request message is received from said third data retrieval requesting means, for subjecting the search keyword to said secondary transformation means in said receiving primary server, and transmitting a remote replicated data retrieval request message containing at least the search keyword to one of said secondary servers that is located in the same primary area and identified by a secondary server identifier obtained by said secondary transformation means.

9. The data management system according to claim 8, further comprising:

second successful search report sending means, disposed in each secondary server and activated when the remote replicated data retrieval request message is received from said fourth data retrieval requesting means, for searching remote replicated data storage in said receiving secondary server to find a record relevant to the search keyword, and if the record is found, sending a successful search report message containing the found record.

10. The data management system according to claim 1, further comprising:

a system supervisory server disposed in the network;

first assignment means, disposed in said system supervisory server and activated when an activation request message is received from one of said primary servers, for assigning a primary server identifier to said requesting primary server so that said requesting primary server will be uniquely identified within the network by the primary server identifier assigned thereto;

first notification means, disposed in said system supervisory server, for notifying said requesting primary server, which has sent the activation request message, of the primary server identifier assigned by said first assignment means, along with network addresses and the primary server identifiers of the other primary servers which have been activated so far; and second notification means, disposed in said system supervisory server and activated when said first assignment means has assigned the primary server identifier, for notifying said primary servers that have already been activated of the primary server identifier assigned by said first assignment means and a network address corresponding thereto.

11. The data management system according to claim 10, further comprising:

second assignment means, disposed in each primary server and activated when an activation request message is received from one of said secondary servers that are located in the same primary area, for assigning a secondary server identifier to said requesting secondary server so that said requesting secondary server will be uniquely identified within the same primary area by the secondary server identifier assigned thereto;

third notification means, disposed in each primary server, for notifying said requesting secondary server, which has sent the activation request message, of the secondary server identifier assigned by said second assignment means, along with the network addresses and the secondary server identifiers of the other secondary servers which have been activated so far; and fourth notification means, disposed in each primary server and activated when said second assignment means has assigned the secondary server identifier, for notifying the other secondary servers that have already been activated of the secondary server identifier assigned by said second assignment means and a network address corresponding thereto.

12. The data management system according to claim 1, wherein
said primary transformation means disposed in said primary servers use the same algorithm for processing the given search keyword, and
said secondary transformation means disposed in said primary and secondary servers located in the same primary area use the same algorithm for processing the given search keyword.

13. The data management system according to claim 1, wherein said primary transformation means applies a primary hash function to the given search keyword.

14. The data management system according to claim 1, wherein said secondary transformation means applies a secondary hash function to the given search keyword.

15. A primary server used in a data management system that allows terminals on a network to register records with search keywords and to retrieve the records by entering a specific search keyword, the data management system covers a plurality of primary areas, the primary server being deployed in each primary area to govern a plurality of secondary servers located therein, the primary server comprising:

a primary server identifier which allows the primary server to be uniquely identified in the network;

primary transformation means for processing a given search keyword to derive a specific primary server identifier indicating one of the primary servers that governs the primary area where the secondary server having a record corresponding to the given search keyword is located; and secondary transformation means for processing a given search keyword to derive a secondary server identifier indicating one of the secondary servers that is located in the same primary area and has a record corresponding to the given search keyword wherein a record originated in one of said primary area and accepted by one of said secondary servers is registered in:
(a) said secondary server that has accepted the record,
(b) a second secondary server that is identified by said secondary transformation means of said accepting secondary server, and
(c) a third secondary server in a primary area other than said originating primary area and that is identified by said primary transformation means serving in said originating primary area.

16. A secondary server used in a data management system that allows terminals on a network to register records with search keywords and to retrieve the records by entering a specific search keyword, the data management system covers a plurality of primary areas, a primary server being deployed in each primary area to cover a plurality of secondary areas constituting the primary area, the secondary server being deployed in each secondary area, the secondary server comprising:

a secondary server identifier which allows the secondary server to be uniquely identified within the primary area where the secondary server belongs; and secondary transformation means for processing a given search keyword to derive a specific secondary server identifier indicating one of the secondary servers that is located in the same primary area and has a record corresponding to the given search keyword wherein a record originated in one of said primary area and accepted by one of said secondary servers is registered in:
(a) said secondary server that has accepted the record,
(b) a second secondary server that is identified by said secondary transformation means of said accepting secondary server, and
(c) a third secondary server in a primary area other than said originating primary area and that is identified by said primary transformation means serving in said originating primary area.

17. The secondary server according to claim 16, further comprising:

registration data storage means, activated when a data registration request message containing registration data is received from one of the terminals, for storing the registration data into regular data storage thereof, the registration data including a search keyword and a data object to be retrieved with the search keyword;

first registration requesting means, coupled to said registration data storage means, for subjecting the search keyword as part of the received registration data to said second transformation means, and if the resultant secondary server identifier differs from the secondary server's own secondary server identifier, transmitting a local replicated data registration request message containing the registration data to one of said secondary servers that is identified by the obtained secondary server identifier in the same primary area as its own; and second registration requesting means for transmitting another data registration request message containing the same registration data as received to one of said primary servers that covers the primary area where the secondary server belongs.

18. The secondary server according to claim 17, further comprising storage means, responsive to the local replicated data registration request message received from said first registration requesting means, for storing the registration data into local replicated data storage thereof.

19. The secondary server according to claim 16, further comprising reporting means, activated when a data retrieval request message containing at least a search keyword is received from one of the terminals, for searching regular data storage in the secondary server to find a record relevant to the search keyword, and if the record is found, sending the found record to the requesting terminal; and transformation activation means, activated when the data retrieval request message is received, for searching the regular data storage to find a record relevant to the search keyword, and if the record is not found, subjecting the search keyword to said secondary transformation means; and first data retrieval requesting means, activated when the secondary server identifier obtained from said secondary transformation means differs from the secondary server's own secondary server identifier, for transmitting a local replicated data registration request message containing at least the search keyword to one of said secondary servers that is located in the same primary area and identified by the obtained secondary server identifier.

20. The secondary server according to claim 19, further comprising data retrieval means, responsive to the local replicated data retrieval request message, for searching local replicated data storage in the secondary server to find a record relevant to the search keyword extracted from the received replicated data retrieval request message;

first successful search report sending means, activated when said data retrieval means has successfully found the record relevant to the search keyword, for sending a successful search report message containing the found record; and second data retrieval requesting means, activated when said data retrieval means has failed to find the record relevant to the search keyword, for sending another data retrieval request message containing at least the search keyword to one of said primary servers that covers the primary area where the secondary server belongs.

* * * * *